United States Patent
Izenberg et al.

(10) Patent No.: US 12,362,991 B2
(45) Date of Patent: Jul. 15, 2025

(54) FPGA-ENABLED COMPUTE INSTANCES

(71) Applicant: Amazon Technologies, Inc., Seattle, WA (US)

(72) Inventors: Erez Izenberg, Tel-Aviv (IL); Nafea Bshara, Seattle, WA (US); Christopher Pettey, Woodinville, WA (US); Curtis Karl Ohrt, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 221 days.

(21) Appl. No.: 17/473,644

(22) Filed: Sep. 13, 2021

(65) Prior Publication Data

US 2022/0078078 A1    Mar. 10, 2022

Related U.S. Application Data

(63) Continuation of application No. 16/120,134, filed on Aug. 31, 2018, now Pat. No. 11,121,915, which is a
(Continued)

(51) Int. Cl.
*G06F 15/78* (2006.01)
*G06F 9/455* (2018.01)
(Continued)

(52) U.S. Cl.
CPC ...... *H04L 41/0806* (2013.01); *G06F 9/45558* (2013.01); *G06F 9/5044* (2013.01);
(Continued)

(58) Field of Classification Search
CPC ............ H04L 41/0806; H04L 41/5054; G06F 9/45558; G06F 9/5044; G06F 9/5077;
(Continued)

(56) References Cited

U.S. PATENT DOCUMENTS

| | | |
|---|---|---|
| 7,904,629 B2 | 3/2011 | Daniel |
| 8,813,072 B1 | 8/2014 | Signaoff et al. |

(Continued)

FOREIGN PATENT DOCUMENTS

| | | |
|---|---|---|
| CN | 101446996 A | 6/2009 |
| CN | 101540764 | 9/2009 |

(Continued)

OTHER PUBLICATIONS

Fahmy et al., Virtualized FPGA Accelerators for Efficient Cloud Computing, 2015 IEEE Conference Paper (Year: 2015).*

(Continued)

*Primary Examiner* — Ario Etienne
*Assistant Examiner* — Kidest Mendaye
(74) *Attorney, Agent, or Firm* — Robert C. Kowert; Kowert, Hood, Munyon, Rankin & Goetzel, P.C.

(57) ABSTRACT

A resource manager of a virtualized computing service indicates to a client that FPGA-enabled compute instances are supported at the service. From a set of virtualization hosts of the service, a particular host from which an FPGA is accessible is selected for the client based on an indication of computation objectives of the client. Configuration operations are performed to prepare the host for the application, and an FPGA-enabled compute instance is launched at the host for the client.

20 Claims, 14 Drawing Sheets

Related U.S. Application Data continuation of application No. 14/986,330, filed on Dec. 31, 2015, now Pat. No. 10,069,681.

(51) Int. Cl.
*G06F 9/50* (2006.01)
*H04L 41/0806* (2022.01)
*H04L 41/5054* (2022.01)

(52) U.S. Cl.
CPC ........ *G06F 9/5077* (2013.01); *G06F 15/7867* (2013.01); *G06F 15/7871* (2013.01); *H04L 41/5054* (2013.01); *G06F 2009/45595* (2013.01)

(58) Field of Classification Search
CPC ............. G06F 15/7867; G06F 15/7871; G06F 2009/45595
USPC ........................................................ 709/222
See application file for complete search history.

(56) References Cited

U.S. PATENT DOCUMENTS

| | | | |
|---|---|---|---|
| 9,064,058 | B2 | 6/2015 | Daniel |
| 9,619,292 | B2 | 4/2017 | Kodialam et al. |
| 9,794,313 | B2 | 10/2017 | Hebert et al. |
| 9,823,947 | B2 | 11/2017 | Chang et al. |
| 10,069,681 | B2 | 9/2018 | Izenberg et al. |
| 10,599,504 | B1 * | 3/2020 | BeSerra ............. G06F 11/3055 |
| 2006/0236004 | A1 | 10/2006 | Yang et al. |
| 2009/0089497 | A1 | 4/2009 | Bulygin et al. |
| 2011/0022812 | A1 * | 1/2011 | van der Linden .. H04L 67/1097 711/E12.001 |
| 2011/0055811 | A1 * | 3/2011 | Ananthanarayanan ... G06F 8/71 717/120 |
| 2012/0117348 | A1 * | 5/2012 | Triantafillou ......... G06F 21/566 711/163 |
| 2013/0159452 | A1 | 6/2013 | Saldana De Fuentes et al. |
| 2013/0205295 | A1 | 8/2013 | Ebcioglu et al. |
| 2013/0318240 | A1 | 11/2013 | Hebert et al. |
| 2014/0143744 | A1 | 5/2014 | Dimond |
| 2014/0189862 | A1 * | 7/2014 | Kruglick ............... G06F 9/5027 726/22 |
| 2014/0215424 | A1 | 7/2014 | Fine et al. |
| 2015/0007182 | A1 * | 1/2015 | Rossbach .............. G06F 9/4843 718/102 |
| 2015/0169376 | A1 | 6/2015 | Chang et al. |
| 2015/0370610 | A1 | 12/2015 | Amann et al. |
| 2016/0094413 | A1 | 3/2016 | Jain |
| 2016/0239906 | A1 | 8/2016 | Kruglick |
| 2017/0090992 | A1 * | 3/2017 | Bivens ................. G06F 9/5072 |
| 2017/0177396 | A1 | 6/2017 | Palermo et al. |
| 2018/0276050 | A1 * | 9/2018 | Gong .................... G06F 9/5083 |

FOREIGN PATENT DOCUMENTS

| | | |
|---|---|---|
| CN | 202472636 | 10/2012 |
| CN | 204462684 | 7/2015 |
| CN | 204615854 | 9/2015 |
| CN | 104991862 A | 10/2015 |

OTHER PUBLICATIONS

"An 311: Standard Cell ASIC to FPGA Design Methodology and Guideline", Altera Corporation, Apr. 2009, pp. 1-28.

"Amazon EC2 Instances", Amazon Web Services, Retrieved from URL: https://aws.amazon.com/ec2/instance-types, Downloaded on Oct. 28, 2015, pp. 1-23.

"Amazon Elastic Compute Cloud User Guide for Linux", Amazon Web Services, Feb. 22, 2010, pp. 1-712.

"Implementing FPGA Design with the OpenCL Standard", Altera Corporation, Nov. 2013, pp. 1-9.

International Search Report and Written Opinion from PCT/US2016/068702, Date of mailing Mar. 29, 2017, Amazon Technologies, Inc., pp. 1-15.

Fei Chen, et al., "FPGA Accelerator Virtualization in an OpenPower cloud", Mar. 19, 2015, Retrieved from URL: https://openpowerfoundation.org/wp-content/uploads/2015/03/Chen-Fei_OPFS2015_IBM031315_final.pdf, pp. 1-13.

Suhaib A. Fahmy, et al., "Virtualized FPGA Accelerators for Efficient Cloud Computing", 2015 IEEE 7th International Conference on Cloud Computing Technology and Science, Nov. 30, 2015, pp. 430-435.

Jagath Weerasinghe, et al., "Enabling FPGAs in Hyperscale Data Center", 2015 IEEE 12th International Conference on Ubiquitous Intelligence and Computing and Trusted Computing, 2015 IEEE 15th International Conference on Scalable Computing and Communications and ITS Associated Workshops, Aug. 10, 2015, pp. 1078-1086.

Office Action mailed May 25, 2021 in Chinese Application No. 201680075027.4, Amazon Technologies, Inc., pp. 1-13 (including translation).

Office Action mailed Jun. 11, 2021 in European Application No. 16826853.0, Amazon Technologies, Inc., pp. 1-13.

Office Action mailed Feb. 9, 2022 in Chinese Application No. 201680075027.4, Amazon Technologies, Inc., pp. 1-18 (including translation).

Duy Viet Vu, et al., "Enabling Partial Reconfiguration for Coprocessors in Mixed Criticality Multicore Systems Using PCI Express Single-Root I/O Virtualization," 2014 International Conference on ReConFigurable Computing and FPGAs (ReConFig14), IEEE, Dec. 8, 2014, 6 pages.

Fei Chen, et al., "Enabling FPGAs in the Cloud," Computing Frontiers (CF'14) May 20-24, 2014 Cagliari, Italy, ACM, 10 Pages.

* cited by examiner

FPGA-ENABLED COMPUTE INSTANCES

This application is a continuation of U.S. patent application Ser. No. 16/120,134, filed Aug. 31, 2018, which is a continuation of U.S. patent application Ser. No. 14/986,330, filed Dec. 31, 2015, now U.S. Pat. No. 10,069,681, which are hereby incorporated by reference herein in their entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As the sophistication and complexity of applications migrated to virtualized computing services increases, it may not always be straightforward to meet application service requirements using unmodified commodity hardware alone. Some applications may, for example, involve very specific types of computations or algorithms that are relatively inefficient to implement on ordinary industry-standard hardware. Customizing support for such applications, while at the same time retaining the scalability, availability, security and cost benefits of large-scale virtualized computing may present a challenge to service providers.

Figure 1:
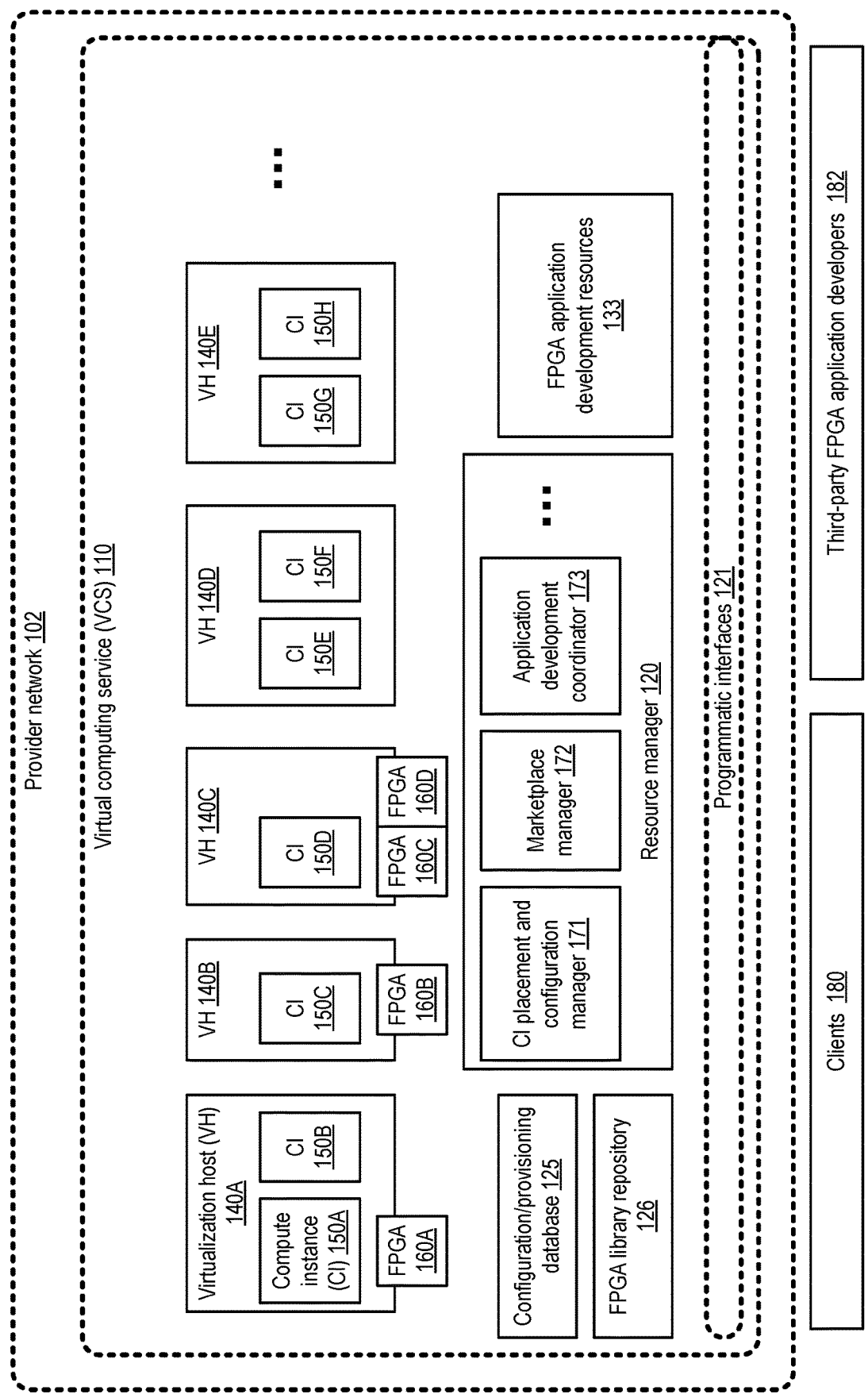
FIG. 1 illustrates an example system environment in which a plurality of categories of compute instances of a virtual computing service, including at least one category of FPGA (filed-programmable gate array)-enabled compute instances are supported, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for supporting client access to FPGA-enabled virtual machines at a virtualized computing service of a provider network are described. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

In various embodiments, a virtualized computing service (VCS) of a provider network may enable clients to utilize virtual machines or "compute instances" of various types, hosted on hardware devices owned and managed by the VCS. Compute instances may also be referred to herein simply as "instances". A hardware device or server at which one or more compute instances may be configured on behalf of one or more VCS clients may be referred to herein as a virtualization host or an instance host. A number of different categories of compute instances may be supported in some embodiments, some of which may be instantiated only at corresponding categories of virtualization hosts. In particular, at least a subset of the virtualization hosts of the VCS may be equipped with one or more FPGAs (field-programmable gate arrays), attached for example via expansion buses compliant with a PCI-E (Peripheral Component Interconnect Express) standard or other buses or interconnects. These virtualization hosts may be used to configure and launch compute instances at which applications that utilize FPGAs are deployed. Such instances may be referred to as FPGA-enabled compute instances. As implied by the term "field-programmable", an FPGA typically includes one or more chips designed to be configured by a customer or a designer after manufacturing. As described below, a number of different approaches or policies with respect to the rights and responsibilities associated with programming FPGAs accessible from FPGA-enabled compute instances may be implemented in different embodiments. In some cases, for example, the provider network operator may be responsible for programming the FPGAs, while in other cases third party vendors or the VCS clients may perform at least some of the FPGA programming. Generally speaking, FPGAs may be used in several different contexts, such as for speeding up processing required for certain types of algorithms, for emulation and testing of new applications or hardware, and so on. In various embodiments, one or more FPGAs of a virtualization host may be considered as companion chips with respect to the host CPU(s), and may be employed as acceleration engines to improve the performance of various scientific, medical, entertainment-related, gaming-related, or other types of software programs being run using the compute instances of the virtualization host.

According to one embodiment, the VCS may provide support for a number of categories of compute instances, including one or more FPGA-enabled categories and one or more categories which are not intended to support FPGA-requiring applications (and therefore may not include the software modules required to access FPGAs). In some cases, the supported categories may be organized into groups called "instance families", with each family including several different instance categories optimized for respective types of applications. For example, a family of FPGA-enabled instance categories may include a "small" and a "large" FPFA-enabled instance category, each of which enables FPGA-requiring applications to be executed, such that a particular instance of the large FPGA-enabled category is capable of superior performance relative to an instance of the small FPGA-enabled category. Other families of instances may be optimized, for example, for software suitable to run on graphical processing units (GPUs), for I/O intensive applications, for floating-point-intensive applications, and the like. Each instance category may have an associated set of pricing policies, supported reservation modes, security policies, and the like. A default instance family for compute instances that have no special high-performance requirements may be supported in at least one embodiment.

The components of the VCS may be divided into two high-level classes in some embodiments: control-plane components and data-plane components. Control-plane components may be responsible for administrative tasks such as managing the health and availability of virtualization hosts and networks, selecting the appropriate virtualization host for a given requested compute instance, enforcing security policies, and the like. The data-plane may comprise those components which are used for communicating and processing client application-related data. In various embodiments, a resource manager comprising one or more control-plane components of the VCS may be responsible for receiving and responding to client requests via various programmatic interfaces, and for coordinating the administrative and configuration operations required to fulfil various types of client requirements. A number of different types of programmatic interfaces for interacting with clients may be implemented at the VCS in different embodiments, including for example one or more sets of application programming interfaces (APIs), web-based consoles, command-line tools, or graphical user interfaces.

FPGA-enabled compute instances may be configured for clients according to a number of different workflows in various embodiments, with each workflow corresponding to a respective pattern of programmatic interactions between the clients and the resource manager. In one workflow, using one or more of the VCS's programmatic interfaces, for example, the resource manager may first provide an indication of the supported instance categories (including FPGA-enabled categories) to the client. The resource manager may then identify, e.g., based on input received programmatically from the client, a particular FPGA-related computational objective of the client, such as the kind of FPGA-utilizing application which the client wishes to run with a desired performance level on an appropriately configured FPGA-enabled compute instance. Based at least partly on the computational objective, such as the particular application the client wishes to run, the client's performance targets, security requirements and the like, a particular FPGA-equipped virtualization host may be selected as a platform at which a compute instance is to be set up for the client. One or more configuration operations to prepare the virtualization host for the client's FPGA-utilizing application may be performed or initiated by the resource manager in some embodiments. One example of such a configuration operation may comprise copying a particular virtual machine image comprising one or more FPGA library modules associated with the client's FPGA-utilizing application to the selected virtualization host in some embodiments. After the virtual machine image has been copied, it may be used to start up the compute instance for the client's application, and the client may be notified that the instance is available for use (e.g., by providing the appropriate network address and credentials which can be used to access the newly-launched instance). Other configuration operations performed to prepare the host may include copying one or more FPGA library modules to a pre-existing instance or to a virtualization management component such as a hypervisor of the host, granting security privileges to enable the client's applications access to an FPGA of the host, verifying that modules to enforce security policies associated with the instance category have been installed at the hypervisor and/or loaded into the FPGA, setting up monitoring of FPGA operations to enable accurate billing, etc. Similar types of configuration operations may be performed in several of the different workflows discussed below in various embodiments.

In a second workflow supported in some embodiments, a client may simply submit a request for a particular FPGA-enabled instance type, without necessarily notifying the resource manager about requirements related to any specific application which is going to be run on the requested instance. In such a scenario, the resource manager may identify a virtualization host that has (a) an FPGA corresponding to the selected instance type and (b) enough capacity to host a new instance, and launch a new instance on behalf of the client at that host. In this allocation mode, one or more of the configuration operations that are required for the client's specific FPGA-utilizing applications (such as copying FPGA library modules) may be performed after the client's instance has been allocated.

In one embodiment, in a third workflow, the client may indicate a target application which is to be run using VCS resources, without previously being made aware of FPGA-enabled instance categories. Based on the description of the application provided by the client, the resource manager may recommend a particular FPGA-enabled instance category to the client. The client may then request an instance of the recommended category, and the resource manager may perform the necessary configuration operations to establish the instance on behalf of the client. In a variation of this workflow, in some embodiments the resource manager may monitor the client's applications on one or more non-FPGA-enabled instances, determine that it may be helpful to transfer the applications to a particular FPGA-enabled instance category, and provide a recommendation for such a transfer to the client. If the client accepts the recommendation, one or more new instances of the recommended FPGA-enabled categories may be set up for the client.

In some embodiments, instead of launching a new instance on behalf of a client after determining the FPGA-related computational objectives of the client, the resource manager may set up a pool of pre-configured FPGA-enabled instances at various virtualization hosts. If a client's objectives can be met using a pre-configured instance, one of the instances from the pool may be allocated to the client, thereby potentially reducing the turnaround time required to fulfill the client's requests.

In at least one embodiment, for example as part of the security policies implemented for various FPGA-enabled instances, a forced cleanup API or command may be supported by the resource manager. If, after completing its use of the FPGA or FPGAs from a given compute instance (or at any time selected by the client), a client wishes to ensure that evidence of the client's use of the FPGAs (such as any leftover data objects) are permanently removed, a forced cleanup command may be issued to the resource manager with respect to the client's FPGA-enabled compute instance. In response to such a command, the resource manager may initiate a set of delete or state reset operations to remove any remaining data associated with the client's FPGA use from that instance. In at least one embodiment, the programming changes that were made at the FPGA or FPGAs to support the client's application or applications may be undone—e.g., the FPGAs may be returned to their states before the client's FPGA-utilizing application was identified by the resource manager.

In some embodiments, the VCS may establish an online marketplace for FPGA-utilizing applications, and implement programmatic interfaces enabling (a) application developers to submit applications for inclusion in the marketplace and (b) clients to explore the marketplace, select desired applications, and request FPGA-enabled compute instances on which the selected applications can be run. The marketplace may be designed to enable clients to select from an array of pre-tested FPGA accelerators for various problem domains which can be run on VCS resources, for example, without requiring the clients to go to the trouble of programming the FPGAs themselves. A third-party FPGA application developer (or a VCS client that has expertise in FPGA-related technologies) may submit a descriptor of a proposed FPGA-utilizing application for inclusion in the marketplace using the programmatic interfaces in some embodiments. The resource manager may verify that the proposed FPGA-utilizing application meets acceptance criteria of the marketplace. If the acceptance criteria are met, an entry for the application may be added to a listing of FPGA-enabled applications of the marketplace; otherwise, the submitter of the proposed application may be informed regarding the reasons for rejection of the application. A number of different types of acceptance criteria may be used in various embodiments—for example, the application may have to be functionally compatible with at least one of the particular FPGAs associated with the FPGA-enabled instance categories of the VCS (that is, at least one of the specific FPGAs supported at the VCS may have to be able to implement the proposed application), meet a set of security-related criteria or policies of the VCS, meet minimum performance requirements defined for the marketplace, and/or meet an expected market size criterion (that is, if the expected demand for the application as estimated by the VCS operator is too low, the application may be rejected even if it meets the other criteria). Other acceptance criteria such as pricing-related targets may also have to be met by proposed applications before they are accepted for the marketplace in some embodiments.

In at least one embodiment, the VCS may provide a set of FPGA application development and testing resources for use by interested parties—e.g., a set of FPGA-equipped virtualization hosts and/or compute instances, a software development kit, and the like may be made available. Using such resources, FPGA application developers may prepare and test new applications, e.g., for potential inclusion in the marketplace. VCS clients may also use such resources to design, code, and/or test their own FPGA-utilizing applications prior to deploying them on the client's FPGA-enabled compute instances.

Many of the network-accessible services implemented at a provider network may support multi-tenancy with respect to at least some types of hardware resources—for example, in general, compute instances allocated to several different clients may be set up at a shared virtualization host, or portions of database tables of several different clients may be stored on the same database storage device. A number of different approaches with respect to multi-tenancy and sharing of FPGAs may be supported in different embodiments. For example, in one approach, for security, performance or other reasons, only compute instances of a single client may be instantiated on a given FPGA-equipped virtualization host. In another approach, multiple FPGAs may be attached to a single virtualization host, multiple clients' compute instances may be established at that host, and each client may be able to obtain shared access to any given FPGA of the host. Other policies with regard to single-tenancy versus multi-tenancy with respect to compute instances at FPGA-equipped virtualization hosts, and with regard to possible sharing of FPGAs, may be supported in various embodiments. In at least one embodiment, a pool of remote FPGAs which can be accessed from a number of virtualization hosts over a fast network interconnect may be established, e.g., instead of attaching FPGAs using PCI-E or other local buses, and FPGA-enabled compute instances may be configured to communicate with the remote FPGAs as needed.

Example System Environment

FIG. 1 illustrates an example system environment in which a plurality of categories of compute instances of a virtual computing service, including at least one category of FPGA (filed-programmable gate array)-enabled compute instances are supported, according to at least some embodiments. As shown, system 100 includes a provider network 102 at which a number of network-accessible services, including virtual computing service (VCS) 110, may be implemented. The VCS 110 includes a resource manager 120 in the depicted embodiment, responsible for coordinating the configuration and allocation of resources on behalf of VCS clients 180, and for implementing various types of programmatic interfaces 121 used for interactions with clients 180 and/or third-party FPGA application developers 182. The resource manager 120 may be considered a control-plane or administrative component of the VCS 110, and may utilize additional control-plane components such as a configuration/provisioning database 125 to fulfill its responsibilities. In the depicted embodiment, the resource manager 120 may comprise a collection of subcomponents, such as a compute instance placement and configuration manager 171 (responsible for selecting and configuring virtualization hosts for compute instances based on the clients' computational requirements or requests), a marketplace manager 172 (responsible for verifying acceptability criteria for FPGA-utilizing applications to be included in an online marketplace of applications suitable for compute instances of the VCS), an application development coordinator 173 (responsible for handling work requests associated with the application development resources 133), and/or other subcomponents. In at least some embodiments, some or all of the individual subcomponents of the resource manager may themselves comprise a distributed collection of computing devices.

As shown, the VCS 110 includes a plurality of virtualization hosts (VHs) 140 in the depicted embodiment, including VHS 140A-140E. Each of the virtualization hosts may have the capacity to support one or more guest virtual machines or compute instances (CIs) 150 on behalf of one or more clients. For example, CIs 150A and 150B have been launched at VH 140A, CI 150C runs at VH 140B, CI 150D runs at VH 140C, CIs 150E and 150F run at VH 140D, and CIs 150G and 150H have been established at VH 140E. In addition the CIs themselves, as discussed below in further detail, the VHs may include virtualization management software components such as hypervisors, administrative-domain operating systems, and/or hardware peripheral devices that implement portions of the virtualization logic. In at least some embodiments, a number of different types of hardware servers may be used as virtualization hosts, and a number of different categories of compute instances may be supported (e.g., with some types of hardware servers being devoted exclusively to a subset of the instance categories). The different categories of compute instances may differ from one another in various characteristics such as the kinds of applications for which they are optimized, their performance capabilities, the level of availability or fault tolerance, the security policies implemented, the pricing models used, and so on. Examples of several different compute instance categories are discussed below in the context of FIG. 2 and FIG. 3.

In the embodiment depicted in FIG. 1, some virtualization hosts of the VCS 110, such as VH 140A, 140B and 140C, have one or more FPGAs 160 attached, while other virtualization hosts such as 140D and 140E are not equipped with FPGAs. For example, VH 140A has FPGA 160A, VH 140B has FPGA 160B, and VH 140C has FPGAs 160C and 160D. In various embodiments, any appropriate interconnects such as expansion buses compliant with one or more versions of the PCI-E standard or a USB (Universal Serial Bus) standard, Ethernet and the like may be used for attaching the FPGAs 160 at the virtualization hosts. In some embodiments, all the virtualization hosts of the VCS may be equipped with FPGAs 160. In at least one embodiment, as discussed below in the context of FIG. 11, a pool of remote FPGAs reachable from some or all of the virtualization hosts may be set up instead of attaching FPGAs locally to virtualization hosts.

Using programmatic interfaces 121, the resource manager may indicate at least two categories of compute instances which can be established at the request of clients 180 in the depicted embodiment: an FPGA-enabled category at which the appropriate modules have been configured to enable FPGA-utilizing applications to run, and a category which does not provide access to FPGAs. Additional compute instance categories may also be supported in various embodiments, and several different FPGA-enabled categories and non-FPGA-enabled categories may be supported in at least one embodiment. If a client wishes to execute an FPGA-utilizing application, the resource manager 180 may perform the needed configuration operations to prepare and launch a compute instance (or allocate a previously-launched compute instance) at one of the FPGA-enabled virtualization hosts on behalf of the client, and provide the client 180 with the required instance configuration information (e.g., a network address or name, as well as the security credentials) to allow the client to use the compute instance. In order to identify an appropriate virtualization host 140 for the client, the resource manager 180 may utilize the configuration and provisioning database 125 in the depicted embodiment. Database 125 may for example include metadata entries indicating the mappings between existing compute instances and hosts, the multi-tenancy and FPGA-sharing rules for various hosts, and so on.

In some embodiments, different FPGAs available in the VCS may differ in their functional and/or performance capabilities, and several different FPGA-enabled compute instance categories may accordingly be supported. In such embodiments, the specific FPGA-equipped virtualization host and/or compute instance category used for the client may sometimes be selected based at least in part on the kind of application that the client wishes to run. For example, FPGA 160B (which may have been implemented by a particular FPGA vendor V1, and may have a FPGA specification S1) may be more suitable for a particular application than FPGA 160A (which may have been implemented by a different vendor V2, and may have a different specification S2). The resource manager 120 may obtain an indication of the target FPGA-utilizing application of a client 180 via programmatic interfaces 121 in some embodiments, and choose the most appropriate virtualization host and/or compute instance category for that application on behalf of the client. To prepare the selected virtualization host, one or more configuration operations may be performed by the resource manager 120, such as transferring a virtual machine image with the appropriate FPGA-related libraries already installed, modifying security-related settings, setting up FPGA operation monitoring, and the like. In other embodiments, clients 180 may simply indicate the compute instance category they wish to acquire, without providing details regarding their specific FPGA-related or other objectives or target applications, and the resource manager may launch an instance of the specified category on a selected virtualization host 140. In some embodiments, the particular FPGA-equipped virtualization host to be used for a client may be selected based on factors such as the client's single-tenancy or multi-tenancy requirements, security requirements or the like.

In at least one embodiment, a resource manager 120 may recommend a particular FPGA-enabled compute instance category to a client, e.g., either based on monitoring the client's applications on a non-FPGA-enabled instance, or based on some description of the client's target applications. In such scenarios, an instance of the recommended category may be set up at a virtualization host 140 if the client accepts the recommendation. Client applications may be migrated to the new instances as needed. In some embodiments, the resource manager may maintain a pool of pre-configured FPGA-enabled compute instances, and allocate instances from the pool if the pre-configured instances meet the client requests or requirements.

The VCS 110 may maintain a repository 126 of FPGA library modules in the depicted embodiment, from which the appropriate modules may be copied to compute instances (or incorporated into virtualization management software such as hypervisors, or into the guest virtual machine images used for client compute instances) as needed. The VCS 110 may also include a set of FPGA application development resources 133 in the depicted embodiment, including for example pools of FPGA-equipped virtualization hosts and/or FPGA-enabled compute instances which can be used to implement new FPGA-utilizing applications by third party developers 182 and/or clients 180. In at least some embodiments, the VCS 110 may provide a software development kit (SDK) to simplify the task of developing and testing FPGA applications. Third party developers 182 and/or clients 180 may submit new FPGA-utilizing applications, prepared using the resources 133 and/or using other resources outside the VCS, for inclusion in an online marketplace of approved applications maintained by the VCS, as discussed below in further detail.

Applications associated with a wide variety of problem domains, such as video, audio and image processing, ASIC (application specific integrated circuit) prototyping, medicine, high-performance computing including machine learning, consumer electronics and the like may be well suited to the FPGA-enabled compute instances supported at VCS 110 in the depicted embodiment. Some such applications may be advertised in the VCS's online marketplace, while others may be implemented by clients 180 on their own initiative without being included in the marketplace. The VCS may typically have very large numbers of virtualization hosts organized in high-availability or fault-tolerant configurations in at least some embodiments, so that new FPGA-enabled instances may be added to a client's fleet as desired if the client's FPGA-utilizing application workload grows.

Example Compute Instance Category Catalog

Figure 2:
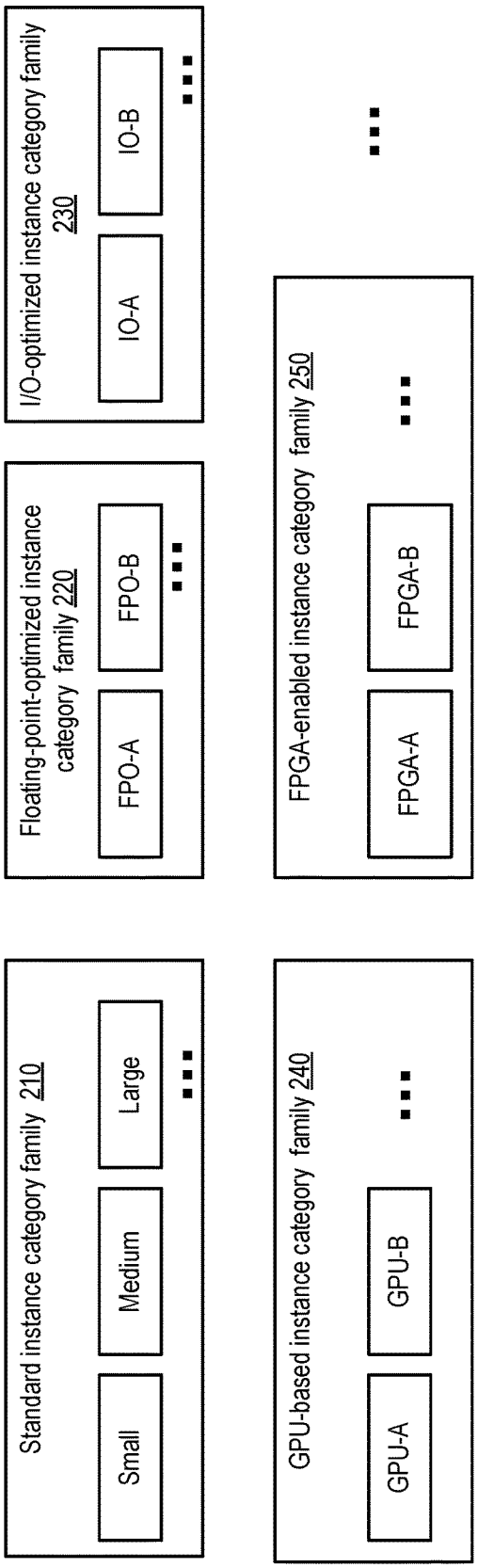
FIG. 2 illustrates an example catalog of compute instance categories which may be supported at a virtual computing service, according to at least some embodiments.

FIG. 2 illustrates an example catalog of compute instance categories which may be supported at a virtual computing service, according to at least some embodiments. In the depicted embodiment, the VCS allows clients to choose compute instances from a number of different instance families of catalog 202. Each family consists of a plurality of instance categories; the members of a given family may in some cases all be optimized for particular kinds of applications but may differ from one another in performance capacity, billing rates, and the like. A standard instance category family 210 comprises general-purpose compute instance categories "small", "medium", and "large" (with the names reflecting relative performance capability levels), suitable for various common applications such as web hosting, software development, office applications and the like. Compute instances belonging to the standard family 210 may typically be configured on commodity virtualization hosts which do not require any custom hardware in the depicted embodiment.

Compute instance categories FPO-A and FPO-B of floating-point-optimized family 220 may be suited for high-end applications involving intensive scientific computations, such as applications associated with astronomy simulations, physics simulations and the like. Some applications may require very high rates of I/O (input-output) operations, and instances of the I/O-optimized instance category family 230 (such as category IO-A or IO-B) may be established for clients with such applications. Applications which can benefit from using graphical processing units (GPUs) may be deployed at instances belonging to GPU-based instance category family 240, such as GPU-A or GPU-B categories. Applications which require or utilize FPGAs may be deployed at instances belonging to the FPGA-enabled instance category family 250, such as FPGA-A category instances or FPGA-B category instances. Additional category families beyond those shown in FIG. 2 may be supported at some VCSs in various embodiments, and some of the category families indicated in FIG. 2 may not be available in some embodiments.

FPGA-Enabled Compute Instance Category Family

Figure 3:
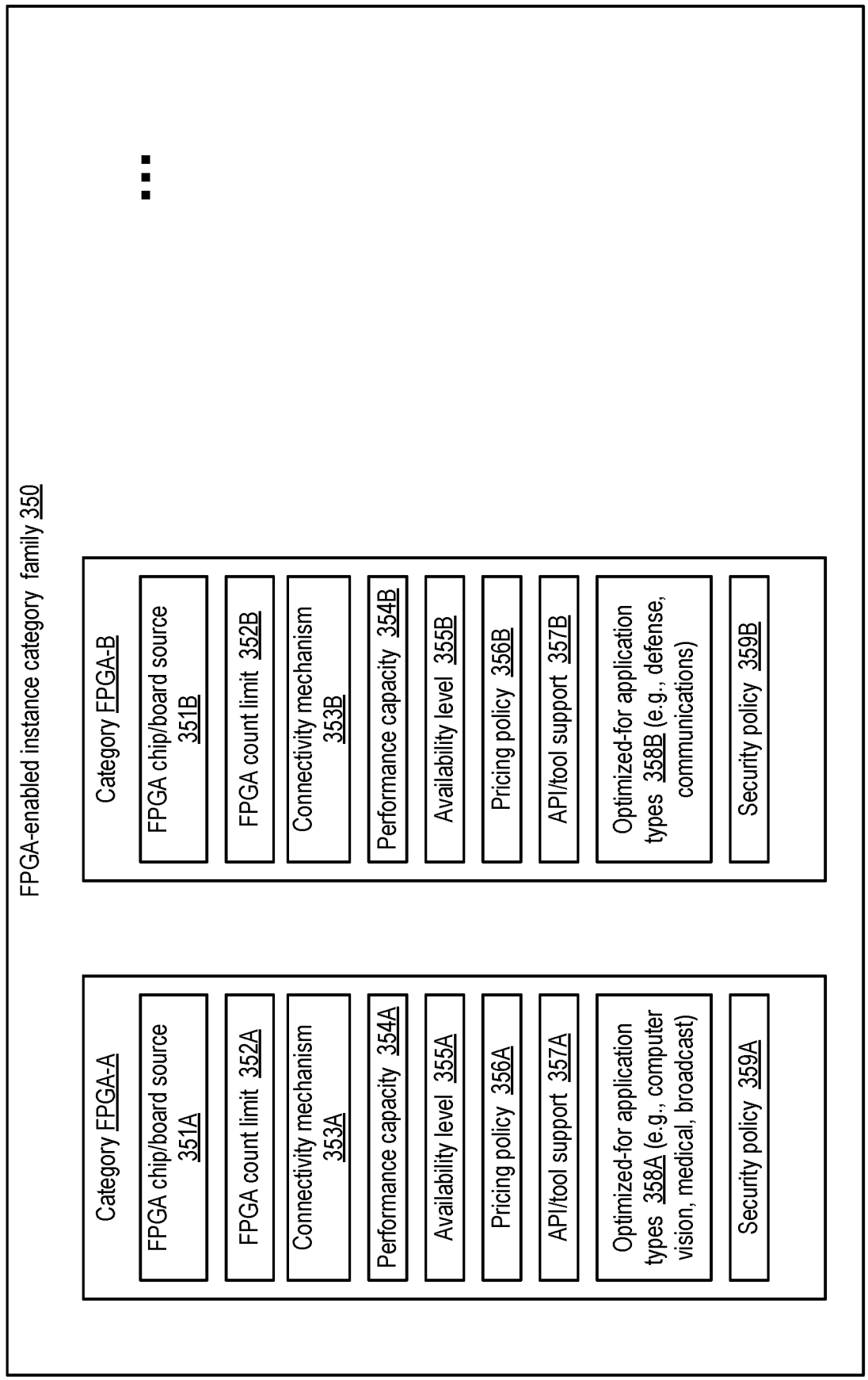
FIG. 3 illustrates example properties of members of a family of FPGA-enabled compute instances, according to at least some embodiments.

FIG. 3 illustrates example properties of members of a family of FPGA-enabled compute instances, according to at least some embodiments. Two example FPGA-enabled instance categories of category family 350 are shown: FPGA-A and FPGA-B. Instances belonging to the two categories may differ in a number of characteristics in the depicted embodiment. For example, the FPGA vendors and/or vendors of the boards on which the FPGAs are placed may differ, as indicated by the two FPGA chip/board source identifiers 351A and 351B. In some cases, the same vendor may be used for multiple FPGAs used for FPGA-enabled instances: for example, the provider network operator may design or manufacture FPGAs of various capability levels and use them for various instance categories. The maximum number of FPGAs which accessible or usable from a given FPGA-A instance (FPGA count limit 352A) may differ from the maximum number of FPGAs which can be used from an instance of category FPGA-B (FPGA count limit 352B).

Respective FPGA connectivity mechanisms 353A and 353B may differ from instance category to another in some embodiments—e.g., PCI-E may be used for instance category FPGA-A while USB or some other mechanism may be used for FPGA-B. The two respective performance capacities 354A and 354B of categories FPGA-A and FPGA-B may differ. Performance capacities may be expressed in any combination of a variety of units in different embodiments—for example, the computing capacity or clock speeds of the host CPUs or the FPGAs, cache sizes, network bandwidth limits or latencies, I/O bandwidth limits or latencies, memory speeds or sizes, and the like.

Instance categories FPGA-A and FPGA-B may also differ in their respective availability levels 355A and 355B (e.g., the minimum fraction of time that the instances of either category are expected to remain online over the course of a year), and/or their pricing policies 356A and 356B (e.g., how much a client is billed for reserving an instance, or for utilizing an instance per unit time) in the depicted embodiments. The APIs or tools support 357A and 357B (e.g., for programming or debugging the FPGAs) may differ from one FPGA-enabled instance category to another in some embodiments. The particular application domains for which a given instance category is optimized (which may in turn depend on some of the other characteristics illustrated in FIG. 3, such as performance limits, API support, and the like) may differ from those for which a different instance category is optimized. For example, FPGA-A instances may be optimized for application types 358A, which may include computer vision, medical and broadcast-related applications, while FPGA-B instances may be optimized for application types 358B, such as defense or communication-related applications. The security policies 359A and 359B may also differ for the different instance categories—e.g., the regions of host memory can be written to from the FPGAs, or regions of FPGA memory can be written to from the instances, the kinds of commands or operations which can be sent for implementation to the FPGAs from the host, the types of multi-tenant vs. single-tenant configurations permitted, the manner in which security privileges are managed, and so on, may differ in the depicted embodiment. In at least one embodiment, a given security policy 359 may comprise one or more rules which are enforced at runtime, e.g., by virtualization management components of the virtualization hosts, by modules of the compute instances themselves, and/or by the FPGAs. One or more such rules may indicate limits or constraints on the resources of the virtualization host which can be accessed and/or modified from an FPGA, for example, while another set of rules may indicate the limits or constraints on the particular FPGA resources which can be accessed or manipulated from the virtualization hosts. Indications of the security policies may be provided programmatically to clients and/or third party application developers in various embodiments, e.g., so that all the interested parties are fully aware of the extent to which the host and FPGA resources are protected.

In at least one embodiment, as mentioned earlier, one or more of the security policies 359 may include support for forced cleanup operations. If and when a client issues a forced cleanup command with respect to a given FPGA-enabled compute instance in such an embodiment, data pertaining to the client's use of FPGAs may be permanently deleted by the resource manager. In some implementations any programming or customization of an FPGA that was performed by the client or on the client's behalf may be undone by the resource manager in response to a forced cleanup request, so that no evidence of the client's FPGA usage remains (and therefore no such evidence can be obtained inadvertently or on purpose by a different client granted access to the FPGA at some later time). In one embodiment, the equivalent of a forced cleanup may be performed regardless of whether a client explicitly requests such a cleanup or not, e.g., at the time that an FPGA-enabled compute instance is decommissioned or released by the client.

It is noted that in various embodiments, the supported FPGA-enabled instance categories may not differ from each other in at least some of the characteristics indicated in FIG. 3—for example, it may be the case that PCI-E is used for all the FPGAs supported by the VCS, in which case the connectivity mechanisms may be identical for all the instance categories. In some embodiments, FPGA-enabled instance categories may differ from one another in characteristics not shown in FIG. 3.

Example Client Interactions

Figure 4:
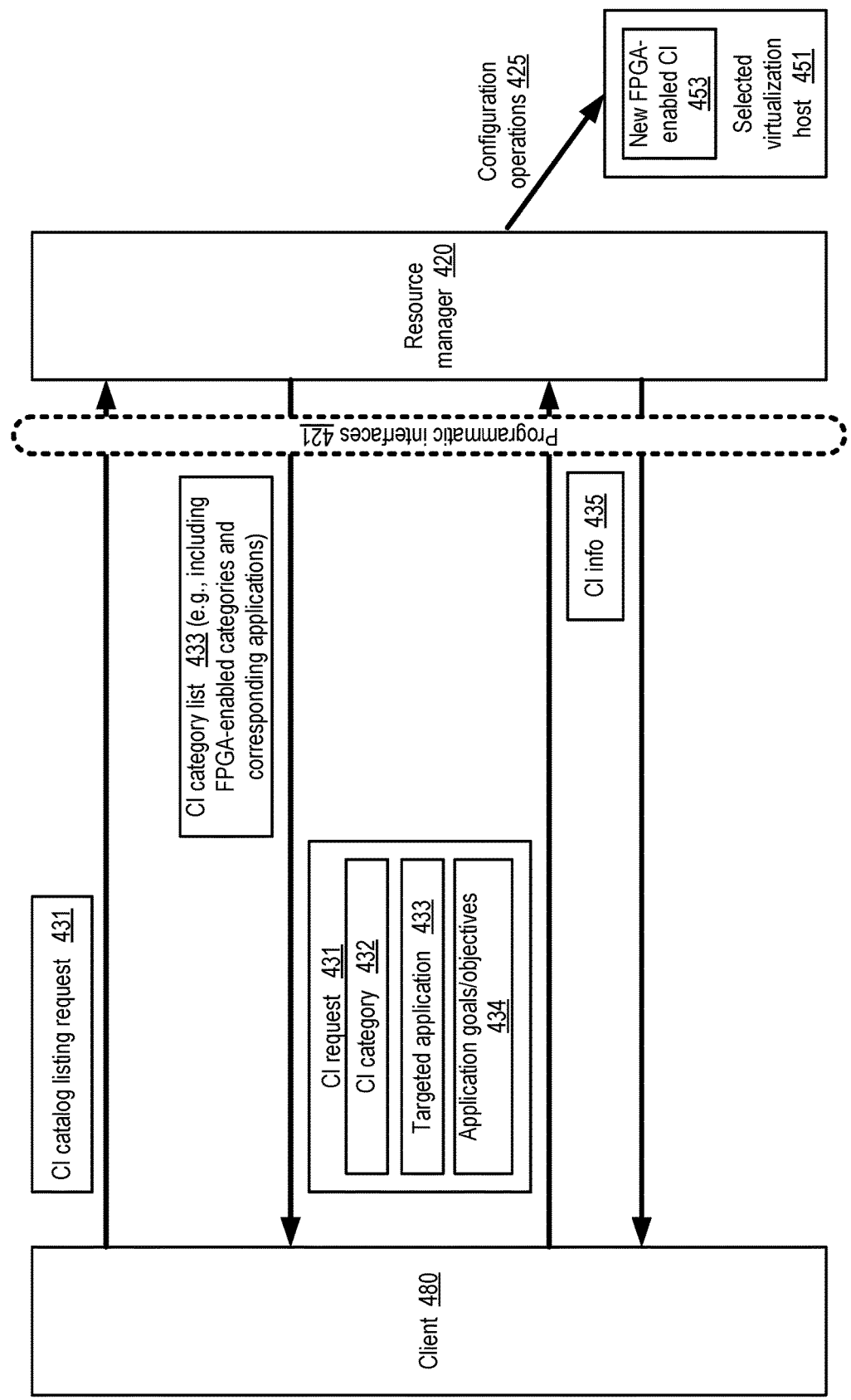
FIG. 4 illustrates example programmatic interactions between a client and a resource manager of a virtual computing service at which FPGA-enabled compute instances are supported, including a submission of a client request for a catalog of compute instance categories, according to at least some embodiments.

FIG. 4 illustrates example programmatic interactions between a client and a resource manager of a virtual computing service at which FPGA-enabled compute instances are supported, including a submission of a client request for a catalog of compute instance categories, according to at least some embodiments. Resource manager 420 may implement one or more programmatic interfaces 421 for receiving and responding to client requests, including for example a web-based console, a set of APIs, command line tools, standalone graphical user interfaces (GUIs), and the like. A VCS client 480 may submit a compute instance catalog listing request 431 via one of the programmatic interfaces 421. In response, the resource manager 420 may provide a compute instance category list 433 which indicates at least one FPGA-enabled category and may provide information about one or more FPGA-utilizing applications for which the category is optimized.

After examining the list of FPGA-enabled categories and associated applications, the client 480 may submit a request 431 for a compute instance. In some embodiments, the request 431 may include, for example, some combination of the following elements: a particular compute instance category 432 selected by the client, an indication of the targeted application 433 the client wishes to run on the instance, and/or application goals or computational objectives 434 such as performance goals, availability goals, security goals, budget constraints, and the like. Based at least in part on the information provided in the request 431, the resource manager 420 may select a particular virtualization host 451 for the client, and perform or initiate one or more configuration operations 425 to prepare the host for a new FPGA-enabled compute instance 453 to be established for the client. A number of different configuration operations may be required in different embodiments, such as copying an appropriate machine image to the host 453, setting up security rules and policies, enabling monitoring, and so on.

After the host has been configured, the new compute instance 453 may be launched in the depicted embodiment, and information 435 about the launched instance (such as its network address, credentials required to access it over the network, and so on) may be provided to the requesting client 480.

Figure 5:
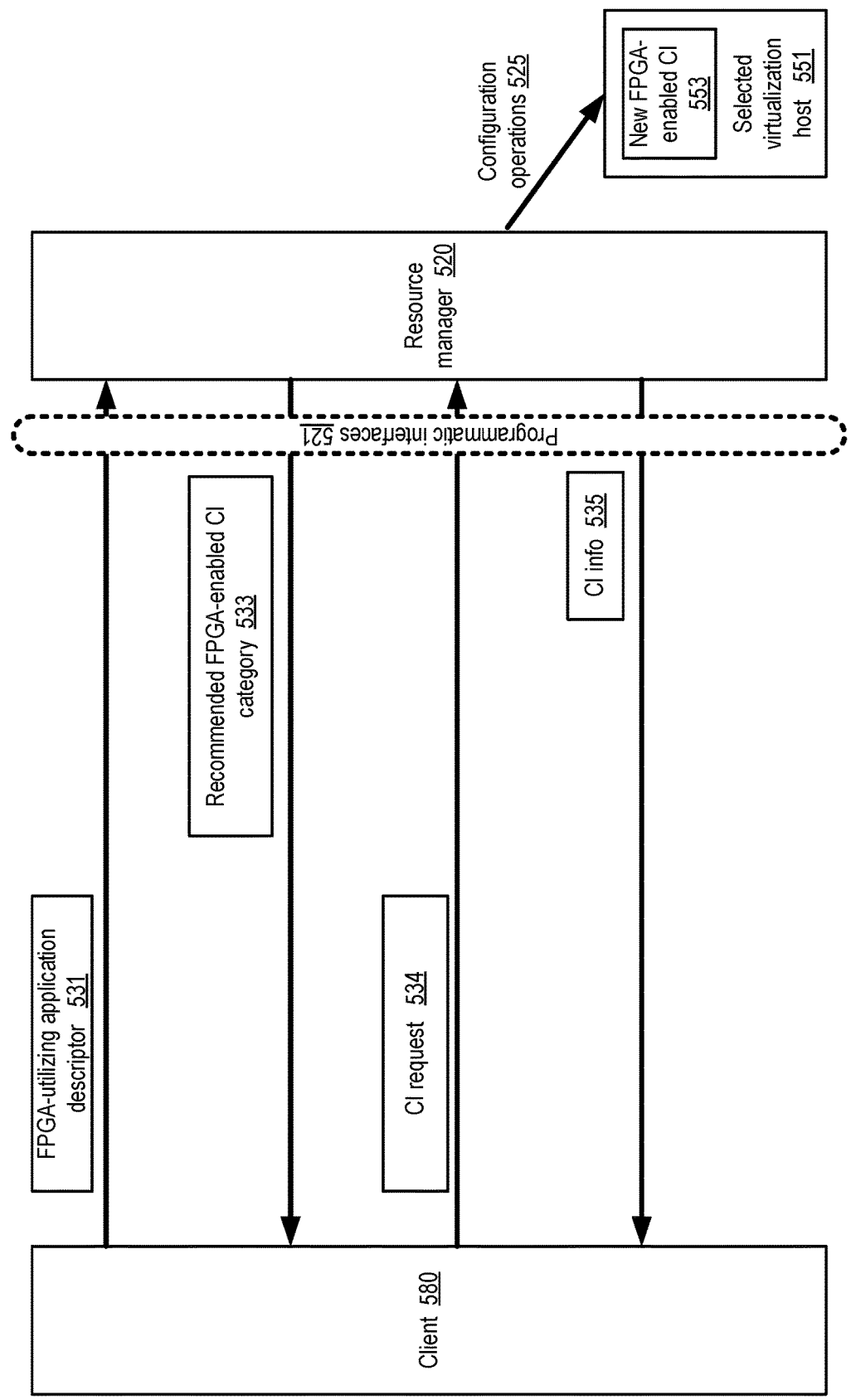
FIG. 5 illustrates a second set of example programmatic interactions between a client and a resource manager of a virtual computing service at which FPGA-enabled compute instances are supported, including a submission of a descriptor indicating an FPGA-compatible application by the client, according to at least some embodiments.

FIG. 5 illustrates a second set of example programmatic interactions between a client and a resource manager of a virtual computing service at which FPGA-enabled compute instances are supported, including a submission of a descriptor indicating an FPGA-compatible application by the client, according to at least some embodiments. In the workflow depicted in FIG. 5, client 580 submits a descriptor 531 of an FPGA-utilizing application that the client wishes to run using a VCS compute instance. The descriptor 531 may be transmitted via one of the programmatic interfaces 521 established by resource manager 520 for client interactions. In some embodiments, descriptor 531 may simply indicate the name or problem domain of the application, while in other embodiments descriptor 531 may include various details such as the kinds of FPGA vendors preferred, performance requirements, availability requirements, security requirements and the like. Based at least in part on the information provided to resource manager 520 in descriptor 531, and/or on the information available to the resource manager 520 regarding the properties of various FPGA-enabled compute instance categories supported at the VCS, the resource manager 520 may send a message indicating a recommended FPGA-enabled compute instance category 533 to the client. The recommended category may be the one selected from the supported categories that most closely matches the expressed or assumed FPGA-related requirements or objectives of the client's application.

After receiving the recommendation, the client 580 may submit a compute instance allocation request 534 indicating the recommended category in the depicted embodiment. In response to the request 534, the resource manager 580 may select a particular FPGA-equipped virtualization host 535 for the client's instance, initiate or perform one or more configuration operations 525 to prepare the virtualization host, and launch a new FPGA-enabled compute instance 553 at the host for the client. Information 535 enabling the client 580 to use the newly-launched instance may then be provided to the client, similar to the CI info 435 discussed in the context of FIG. 4.

Figure 6:
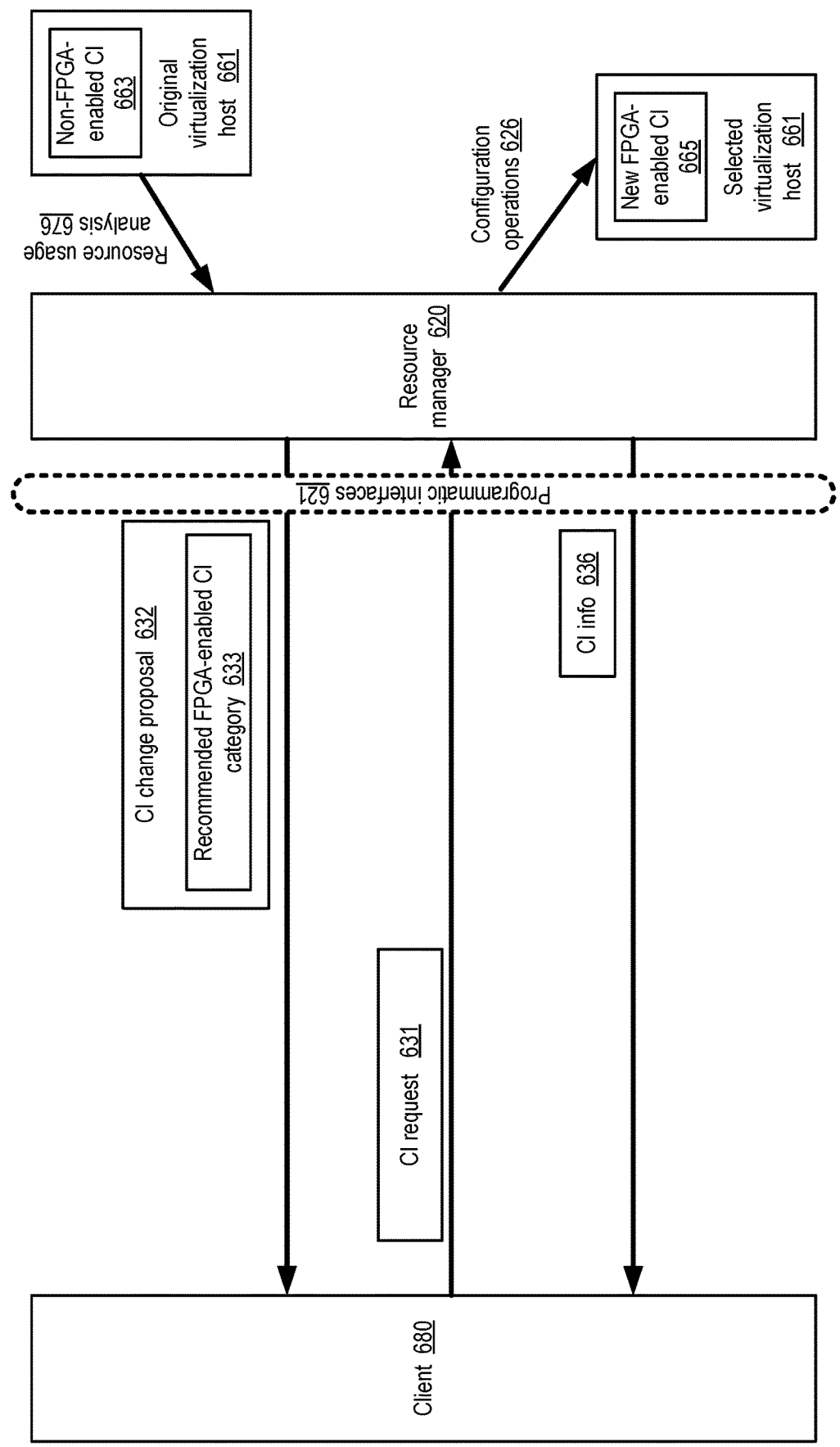
FIG. 6 illustrates a third set of example programmatic interactions between a client and a resource manager of a virtual computing service at which FPGA-enabled compute instances are supported, during which the resource manager proactively recommends an FPGA-enabled compute instance category to the client, according to at least some embodiments.

FIG. 6 illustrates a third set of example programmatic interactions between a client and a resource manager of a virtual computing service at which FPGA-enabled compute instances are supported, during which the resource manager proactively recommends an FPGA-enabled compute instance category to the client, according to at least some embodiments. In FIG. 6, the resource manager 620 monitors one or more applications of client 680 which are being run on a compute instance 663 which is not FPGA-enabled (i.e., applications running in instance 663 do not have access to an FPGA) and is being run at a virtualization host 661 which may or may not be equipped with an FPGA. Based on resource usage analysis 676 associated with the client's application, the resource manager may be able to determine that the client's application is suitable for execution in an FPGA-enabled execution environment. The resource usage analysis may indicate, for example, that the patterns of computations being performed by the client's applications can be accelerated using an FPGA available at one of the FPGA-enabled compute instances supported by the VCS. In some cases it may be possible for the resource manager to deduce that an FPGA-enabled version of the client's application may be available in an online marketplace, e.g., by simply examining the names of the software modules or processes being executed on behalf of the client.

The resource manager 620 may transmit a compute instance change proposal 632 to the client 680 via programmatic interfaces 621, indicating that it may be helpful to move the client's application to (or run an FPGA-accelerated version of the client's application at) an FPGA-enabled compute instance of a specified category 633. If the client 680 accepts the recommendation, a new compute instance request 631 may be submitted via the resource manager's programmatic interfaces. An FPGA-enabled virtualization host 661 may be selected for the client by the resource manager, the appropriate configuration operations to enable the launch of a new FPGA-enabled compute instance 665 may be initiated or performed, and the client may be provided information 636 enabling access to the newly-launched compute instance 665 in the depicted embodiment. It is noted that in at least some scenarios similar to those shown in FIGS. 4, 5 and 6, no additional configuration operations may be needed at a given virtualization host to launch a new FPGA-enabled instance—e.g., all the required modules and/or machine images may already be available at a given host if it is already being used for some other similar FPGA-enabled instance.

Figure 7:
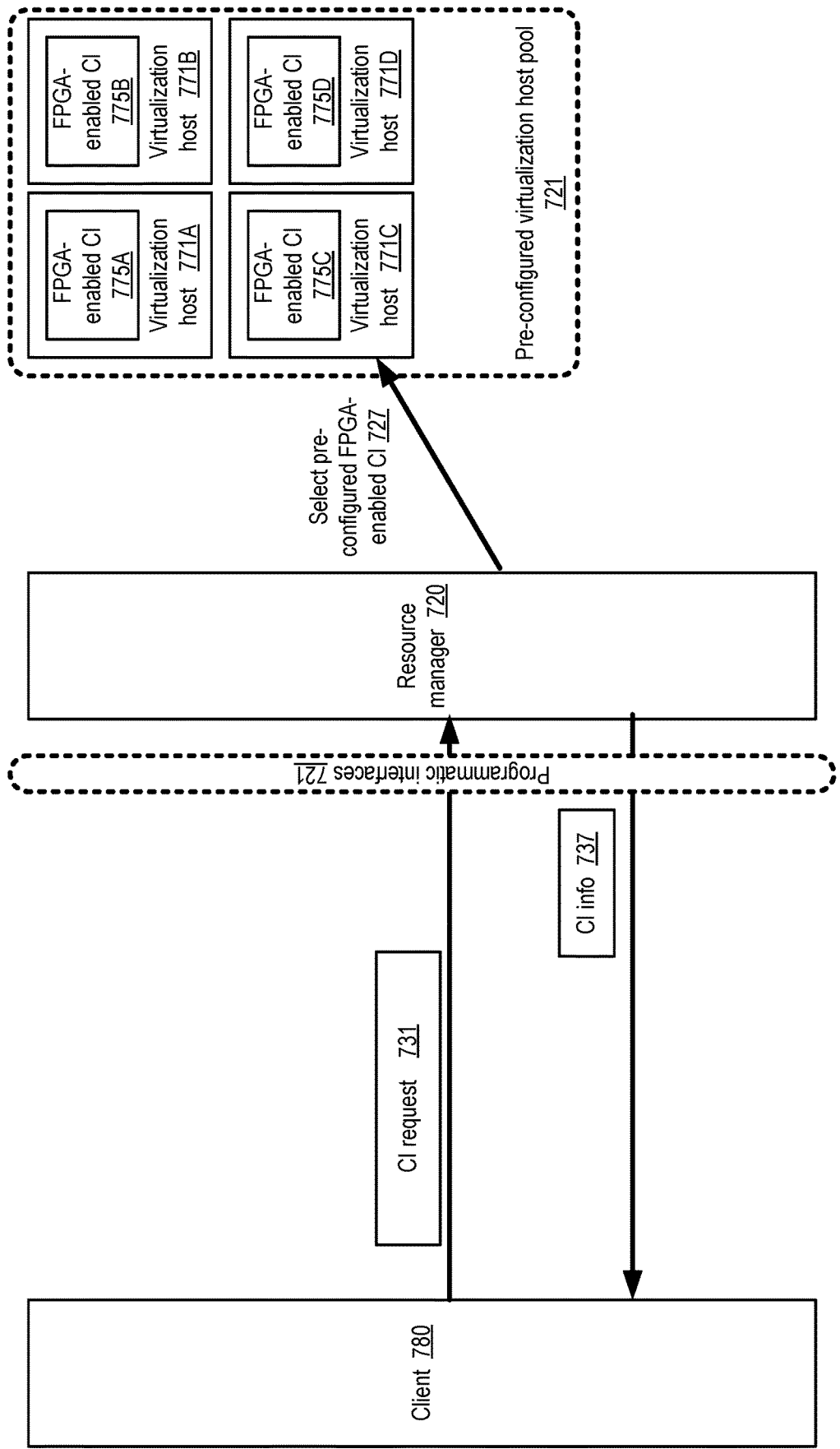
FIG. 7 illustrates a selection of a pre-configured FPGA-enabled compute instance for a client by a resource manager, according to at least some embodiments.

In the scenarios depicted in FIGS. 4, 5 and 6, the resource manager instantiated a new compute instance for the client after preparing a selected virtualization host if such preparation is required. In some embodiments, a pool of pre-configured unassigned FPGA-enabled compute instances may be set up, and allocated to a client with a matching request or FPGA-related computational objective. FIG. 7 illustrates a selection of a pre-configured FPGA-enabled compute instance for a client by a resource manager, according to at least some embodiments. As shown, client 780 may submit a compute instance request 731 to resource manager 720 via programmatic interfaces 721. The request 731 may either explicitly indicate a client-selected compute instance category, or may name or describe a particular FPGA-utilizing application that the client wishes to run.

In response to receiving the client's request 731, the resource manager 720 may determine whether the request can be fulfilled using an existing pre-configured FPGA-enabled compute instance 775, such as one of instances 775A-775D on virtualization hosts 771A-771D of host pool 721. A number of different FPGA-enabled instances belonging to different instance categories may be pre-configured in some embodiments, e.g., based on an analysis of observed demand for various types of supported instance categories. If a pre-configured instance that is capable of meeting the client's requirements is available in pool 721, that instance may be selected and assigned to the client as indicated by arrow 727 of FIG. 7. A message containing information 737 identifying the selected pre-configured instance and enabling the client to access the instance may be transmitted via programmatic interfaces 721. Using pre-configured instances, the turnaround time for responding to a client's FPGA-associated requirements may be reduced, as some of the preparatory configuration steps that may be required for a completely new instance may be avoided.

Marketplace for FPGA Applications

Figure 8:
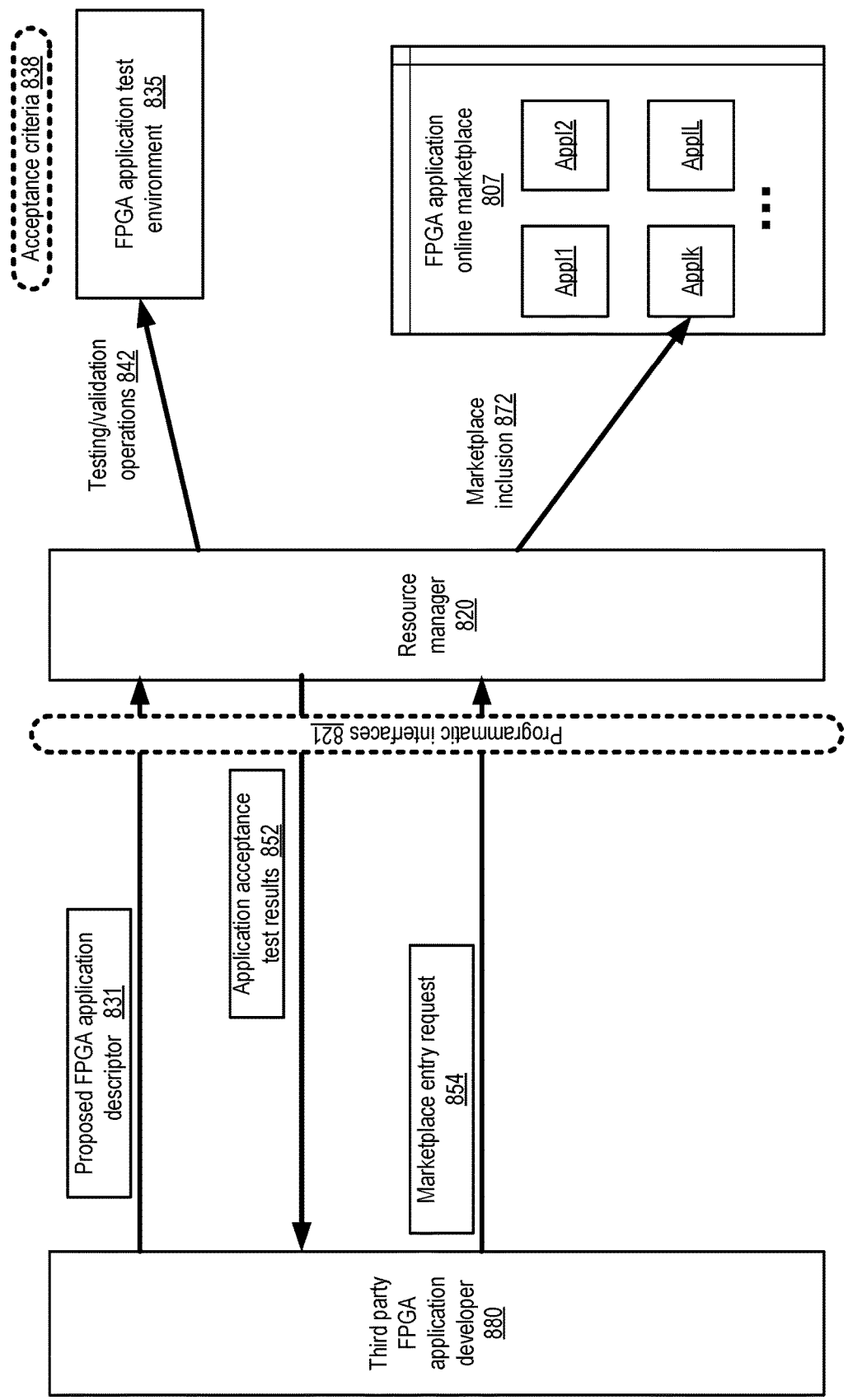
FIG. 8 illustrates example programmatic interactions between an FPGA application developer and a resource manager of a virtual computing service, according to at least some embodiments.

In at least some embodiments, as mentioned above, a network-accessible marketplace through which third-party developers (and in some cases VCS clients) may offer FPGA-utilizing applications may be implemented at a VCS. FIG. 8 illustrates example programmatic interactions between an FPGA application developer and a resource manager of a virtual computing service, according to at least some embodiments. In the depicted embodiment, a third party FPGA application developer 880 (e.g., an entity which is not owned or managed by the provider network operator responsible for the VCS, and may not necessarily be a client of a service implemented at the provider network) may utilize programmatic interfaces 821 of the VCS to submit a descriptor 831 of a proposed FPGA-utilizing application produced by the application developer. The application descriptor 831 may include enough information, such as the kind of FPGA or FPGAs required for the application, the FPGA configuration specified in the appropriate language (e.g., in a Hardware Description Language compatible with the FPGA), security policies supported by the application, APIs or other interfaces made available by the application, and the like, to enable the resource manager to check whether a set of acceptance criteria 838 associated with the VCS's marketplace are met by the application. A number of different kinds of acceptance criteria may be checked, such as for example functional compatibility with the FPGAs supported at the VCS, minimum performance criteria for various types of operations supported by the application, compatibility with the marketplace's security policies, as well as business criteria such as pricing policies compatible with the marketplace's goals and/or an anticipated minimum demand or market size for the application. To verify whether some of the criteria have been met, the application may be tested using one or more FPGA application test environments 835 in the depicted embodiment.

The results 852 of the acceptance testing/validation operations 842 may be provided to the third-party developer 880 in the depicted embodiment via the programmatic interfaces 821. With respect to business-related acceptance criteria, the resource manager may receive programmatic confirmations of acceptability from business analysts affiliated with the provider network operator in various embodiments. If the acceptance criteria have been met, the developer 880 may submit a marketplace entry request 854 in the depicted embodiment, and the application may be added to a list of available or advertised applications of the online marketplace 807, as indicated by arrow 872. Clients may then view or browse the marketplace, select the application, and submit requests indicating that the application be instantiated on their behalf at appropriate FPGA-enabled instances.

A number of different modes for accessing, using and sharing FPGA-enabled applications from the marketplace may be supported in different embodiments. Some of the applications may be accessible to any client of the computing service, for example, other applications may be restricted to specified groups of clients, while a third category of applications may be placed in the marketplace but only accessible to a single client (e.g., to entities sharing a single client account identifier of the VCS). In one embodiment, one or more "internal-use-only" FPGA-enabled applications may be included in the marketplace. Such internal-use-only applications may only be accessible to and usable by authorized entities of the VCS and/or other services implemented within the provider network, and may not be used by external clients. In at least one embodiment, an access policy indicating the set of entities that can view or use a given application may be included in the corresponding marketplace entry request 854 for that application. Before configuring an FPGA-enabled compute instance from which the given application is to be run, in various embodiments the resource manager may verify that the entity on whose behalf the compute instance is set up is included in the set of entities permitted to use the given application. The listing or marketplace applications provided to different entities may differ based on the application access policies in some embodiments: e.g., if a particular client is not permitted to use a given marketplace application Appl1, the view of the marketplace that is provided to that client may not include Appl1.

In various embodiments, at least some marketplace applications may have an associated set of tools and/or user APIs, e.g., to simplify interactions with the applications, perform configuration operations on the applications, etc. Such tools and/or APIs may be provided to the entities that use the applications in various embodiments—for example, as part of the configuration of a virtualization host or FPGA-enabled compute instance from which a given marketplace application such as Appl1 is to be run, the tools and APIs associated with Appl1 may be installed.

FPGA Application Development Resources

Figure 9:
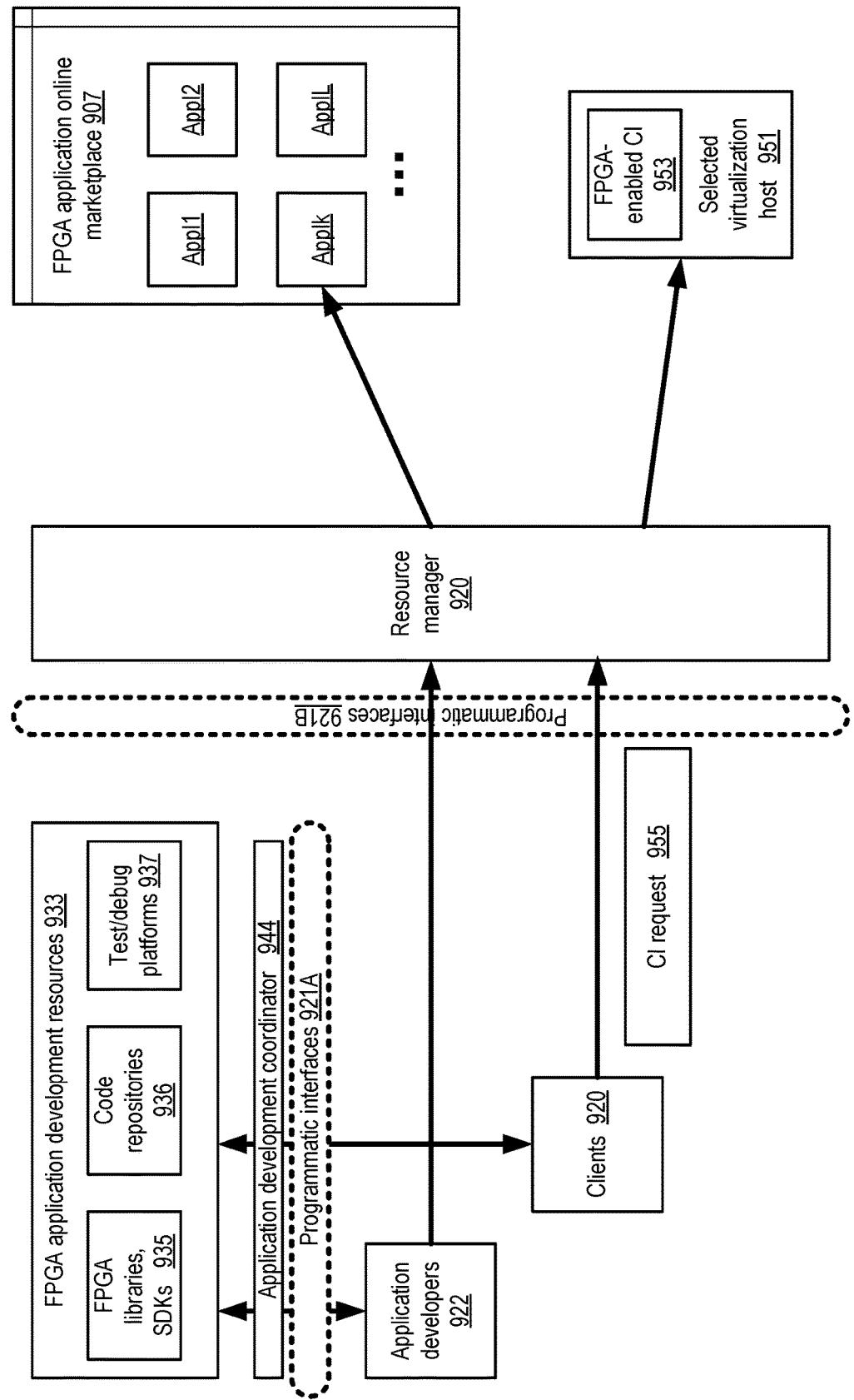
FIG. 9 illustrates the use of example FPGA application development resources made available for clients and partners of a virtual computing service, according to at least some embodiments.

In some embodiments, a set of VCS resources may be set aside to help clients and third party application developers to design, develop and test FPGA-utilizing applications which can then be deployed for production use at compute instances of the VCS or advertised and sold via an online marketplace. FIG. 9 illustrates the use of example FPGA application development resources made available for clients and partners of a virtual computing service, according to at least some embodiments. As shown, FPGA application development resources 933 may include a set of libraries and software development kits (SDKs) 935, space for code repositories 936, as well as a set of FPGA-equipped test and debug platforms 937 in the depicted embodiment. The test and debug platforms may, for example, include some number of FPGA-enabled compute instances corresponding to the various FPGA-enabled instance categories supported at the VCS, so that the functional compatibility and performance of the FPGA-utilizing applications can be tested on the same kinds of hardware and software at which the applications are eventually expected to be run. In other embodiments, some of the kinds of resources shown in FIG. 9 may not be made available—e.g., clients and developers may have to utilize their own code repositories.

Application development and testing programmatic interfaces 921A may allow third-party application developers 922 and/or VCS clients 920 to utilize the application development resources 933 to design, develop, debug and test various FPGA-utilizing applications, at least some of which may eventually be run in production mode using FPGA-enabled compute instances of the VCS. In response to receiving a particular request via the programmatic interfaces 921A, for example, an application development coordinator component 944 of the resource manager may allocate a selected resource of the virtual computing service to perform an operation indicated in the particular request. The operation may, for example, include modifying program code of a particular FPGA-utilizing application or testing a particular FPGA-utilizing application. In some embodiments, the application development coordinator may comprise control-plane resources separate from the resource manager responsible for allocating compute instances to clients and/or managing the marketplace, while in other embodiments all these responsibilities may be combined within the resource manager. The application developers 922 may be considered a special category of "clients" of the VCS in some embodiments, in that while they utilize the application development resources 933, they may not necessarily acquire compute instances for production-level deployment of the applications. Instead, for example, the application developers may submit applications that they have developed for inclusion in the VCS's online marketplace 907, e.g., via marketplace entry requests 954 submitted using another set of VCS programmatic interfaces 921B in the depicted embodiment. Clients 920 may also use the application development resources for their own FPGA-utilizing applications in the depicted embodiment, which may not necessarily be placed in the online marketplace and/or shared with other clients. Instead, after a client 920 has tested their application, they may submit a request 955 for one or more FPGA-enabled compute instances 953 via programmatic interfaces 921B. The resource manager 920 may then perform the necessary configuration operations to enable the appropriate kinds of FPGA-enabled compute instances 953 at selected FPGA-equipped virtualization hosts for the client.

In various embodiments, different entities may be responsible for programming and configuring the FPGAs accessible from compute instances of the VCS. In some embodiments, for example, the clients 920 may develop their own applications (as long as the applications conform to the security and other policies of the VCS), and the VCS operator may perform only a minimal level of programming at the FPGAs (e.g., to ensure that security policies are not violated at runtime). In other embodiments, clients may be provided with turnkey FPGA accelerators, with much or all the work of programming the FPGAs already completed by third party developers and/or the VCS operator. In the latter scenarios, the clients may simply launch FPGA-utilizing applications from their compute instances as and when needed. In some embodiments, the responsibilities of programming the FPGAs may be shared—e.g., some of the programming may be performed by the VCS owner, some by third party developers 922, and some by the clients 920. In some cases, a client may be allocated a compute instance from which access to a pre-programmed FPGA is enabled, and the client may be granted the rights to perform additional programming or re-programming of the FPGA. In one scenario, a client may be given full control over the programming of an FPGA. For example, the VCS may simply grant the client access to an un-programmed FPGA accessible form a compute instance set up on behalf of the client, inform the client that the client is authorized to program the FPGA, and let the client program the FPGA as desired. The VCS may provide a highly flexible framework in such embodiments, enabling desired levels of FPGA customization to be implemented by clients and/or third parties.

Tenancy and FPGA Sharing

Figure 10:
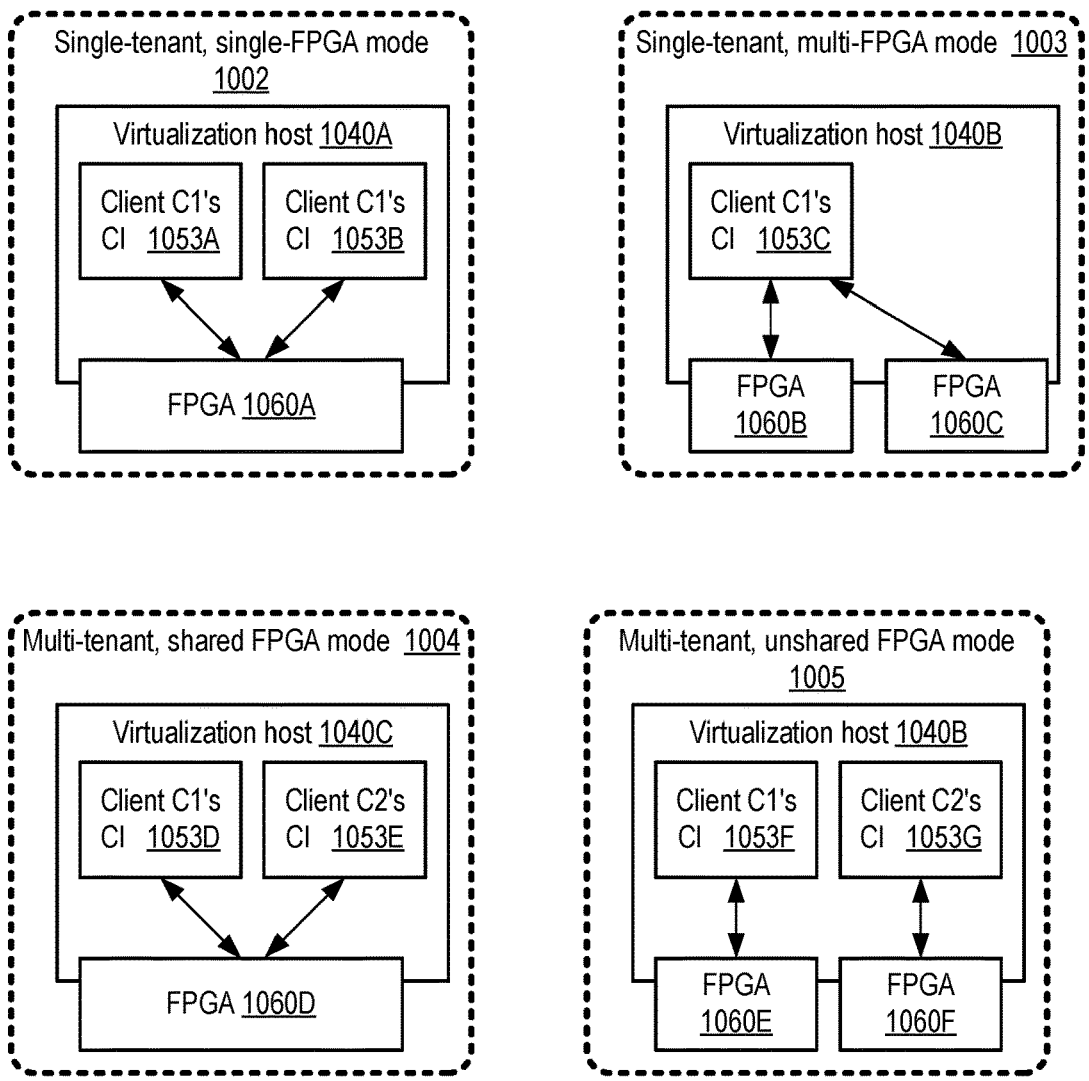
FIG. 10 illustrates examples of sharing modes with respect to virtualization hosts equipped with FPGAs, according to at least some embodiments.

As mentioned earlier, many of the services implemented at provider network typically rely on sharing resources among numerous clients to achieve desired levels of operational efficiency and cost reduction. With respect to some FPGA-utilizing applications, however, from the client's perspective, sharing access to the FPGAs (either concurrently or serially) may not necessarily be advisable, e.g., for performance-related and/or security-related reasons. In order to accommodate the diverse needs of different clients, while still targeting the cost savings afforded by resource sharing, a flexible framework for sharing and multi-tenancy of FPGA-equipped resources may be implemented in at least some embodiments. FIG. 10 illustrates examples of sharing modes with respect to virtualization hosts equipped with FPGAs, according to at least some embodiments.

In the depicted embodiment, in single-tenant single-FPGA mode 1002, only a single FPGA 1060A may be attached to or made accessible from a given virtualization host 1040A to achieve a high level of security, although several different compute instances belonging to the same client or tenant C1 may be set up at the host 1040A. For example, depending on the client's requests or computational objectives, two different instances 1053A and 1053B may be set up at host 1040A, and both the instances may access the FPGA 1060A if needed.

In single-tenant, multi-FPGA mode 1003, virtualization host 1040B includes a plurality of FPGAs, such as FPGA 1060B and 1060C. In such a scenario, multiple different FPGA-utilizing applications, at least some of which require the use of different FPGAs, may be run from the same compute instance 1053B set up for a given client C1 (or from another instance set up for the same client at the same host 1040B). In multi-tenant, shared-FPGA mode 1004, virtualization host 1040C includes a single FPGA 1060D which may be shared among compute instances 1053D (set up on behalf of client C1) and 1053E (set up on behalf of a different client C2). In multi-tenant, unshared-FPGA mode 1005, a virtualization host 1040D may comprise or have access to a plurality of FPGAs including FPGA 1060E and 1060F, and access to a given FPGA may be restricted to instances belonging to a single client. For example, compute instance 1053F established on behalf of client C1 is granted rights to access FPG1 1060E, and compute instance 1053G established on behalf of client C2 is granted rights to access FPG1 1060F. However, neither 1053F nor 1053G may access the other instance's FPGA in the depicted embodiment.

In some embodiments, combinations of the kinds of sharing and tenancy arrangements indicated in FIG. 10 may be used. For example, if a given virtualization host includes several different FPGAs, some of the FPGAs may be shared among instances of several clients, while others of the FPGAs may be used exclusively for one client. The kinds of multi-tenancy and FPGA-sharing approaches used with respect to a given compute instance may be defined in the security policy associated with the corresponding compute instance category in some embodiments. For example, security policies 359A and 359B of FIG. 3 may control whether FPGAs of categories FPGA-A and FPGA-B may be shared among multiple instances, whether instances belonging to different clients may co-exist on the same virtualization host, and so on.

In at least one embodiment, if a client C1 already has a particular FPGA-utilizing application running at an FPGA-enabled compute instance such as 1053A, and the resource manager receives another request from the same client C1 indicating a second FPGA-utilizing application to be run, the resource manager may recommend that the pre-existing instance 1053A be used for the second FPGA-utilizing application (assuming that the same FPGA can be used for the second application). In other embodiments, or based on the preferences of the client, a new instance such as 1053B may be launched for the second application.

In some cases, different FPGA-utilizing applications may require FPGAs with differing specifications or capabilities, in which case it may not be possible to accommodate the different applications at the same compute instance. For example, it may be the case that a client wishes to run two different FPGA-utilizing applications App1 and App2, where the FPGA used for App1 cannot be used (i.e., is non-compliant functionally) for App2. In the latter scenario, if a given virtualization host has access to just one FPGA, that host may not be usable for both applications. In some embodiments, upon determining that a particular FPGA such as 1060A which is currently in use on behalf of a client C1 cannot be used for a second application of the client, the resource manager may instantiate a different compute instance on a different host for the same client. In some embodiments, clients may indicate their multi-tenancy versus single-tenancy preferences, and/or their FPGA sharing preferences, in their programmatic interactions with the resource manager, and the resource manager may take the appropriate resource allocation choices based on the client's preferences. In one embodiment, if and when a client wishes to use an FPGA-enabled compute instance in single-tenant mode, for example, the resource manager or other control-plane components of the virtualized computing service may store a metadata entry associated with the particular virtualization host at which the client's instance is configured, (e.g., in a configuration/provisioning database similar to database 125 of FIG. 1) containing a directive that the host should not be used for compute instances of any other client. Similar metadata entries indicating client preferences for other tenancy levels or FPGA sharing levels may also be stored on behalf of various clients.

Figure 11:
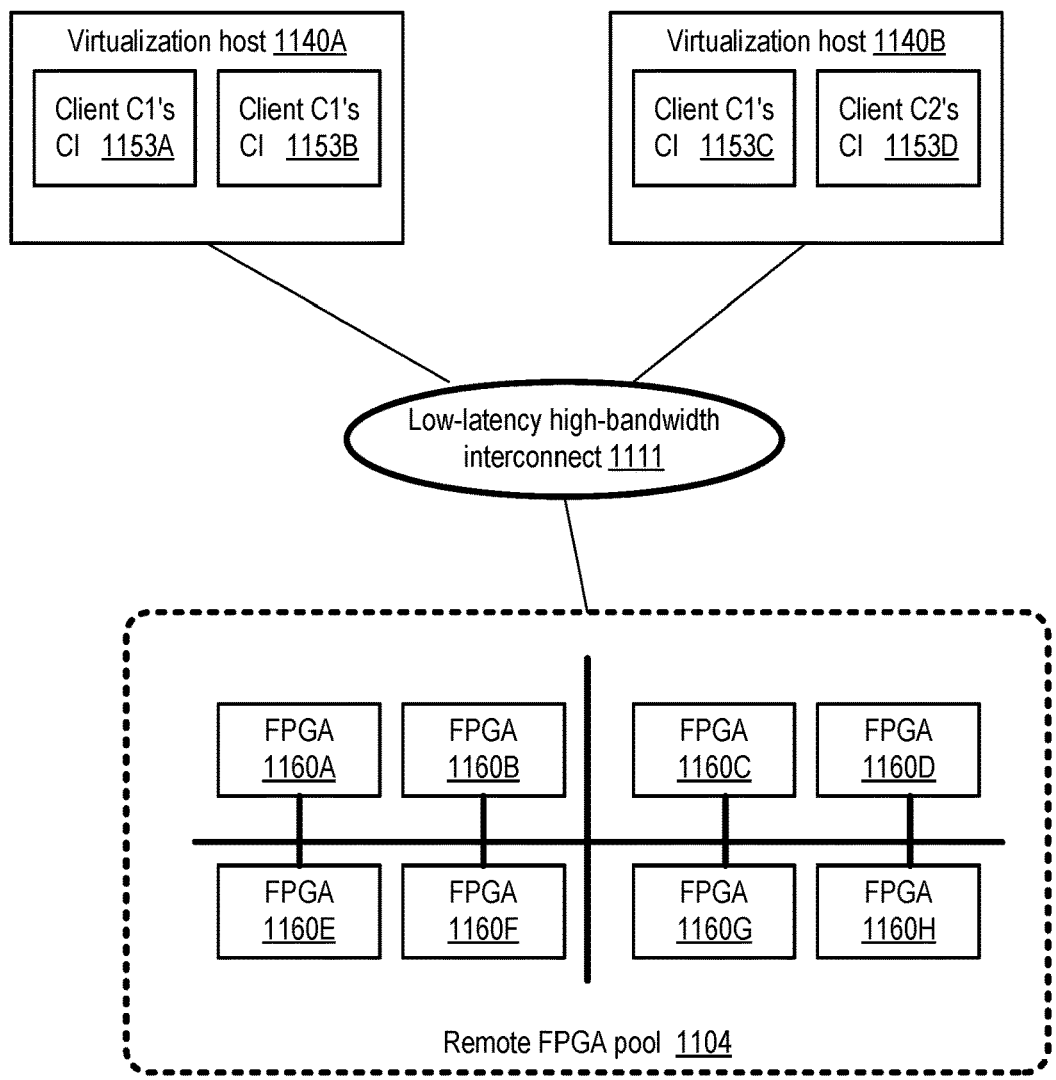
FIG. 11 illustrates an example configuration in which a remote pool of FPGAs may be utilized from a compute instance of a virtualized computing service, according to at least some embodiments.

In some embodiments, instead of being attached to a virtualization host's expansion bus, FPGAs may be configured in pools reachable from the host via a fast network interconnect. FIG. 11 illustrates an example configuration in which a remote pool of FPGAs may be utilized from a compute instance of a virtualized computing service, according to at least some embodiments. As shown, virtualization hosts 1140A and 1140B as well as FPGAs 1160A-1160H are connected to a low-latency high-bandwidth network interconnect 1111 in the depicted embodiment. Any appropriate high-speed interconnect 1111 may be used for communication between the virtualization hosts and the FPGAs 1160. In such an arrangement, instead of making modifications to individual virtualization hosts, the pool 1104 of FPGAs may be scaled up if the demand for FPGA-enabled instances (such as instances 1153A-1153D) increases over time. In addition, a variety of FPGAs with different functional and performance capabilities may be included in pool 1104, and accessed from different virtualization hosts 1140 as needed, thereby increasing the flexibility of the FPGA support provided by the VCS. Several such remote pools may be set up within the VCS in some embodiments. Although a given remote pool 1104 of FPGAs may be accessed from numerous virtualization hosts via an interconnect similar to interconnect 1111, any given FPGA need not necessarily be shared among different virtualization hosts and/or different clients concurrently. Thus, it may be possible to implement several different sharing modes with respect to individual FPGAs 1160 in an arrangement of the kind shown in FIG. 11. For example, a given FPGA 1160 may be shared among different compute instances of the same client (at the same host or at different hosts), or among compute instances of different clients, or managed in non-shared mode (with access granted to a single compute instance).

In another mode of remote FPGA use at a virtualized computing service, in some embodiments a set of hosts that have respective locally-attached FPGAs may be configured for remote access. For example, consider a scenario in which one host H1 has a local FPGA FPGA1, while a different host H2 does not have an FPGA. In one embodiment, an application running at H2 (e.g., at a compute instance set up on H2, or on a non-virtualized operating system running on H2) may be permitted to access and use FPGA1, e.g., via a network connection established between H1 and H2. A host (such as H1 in the above example) which allows remote access to its FPGA may run its own non-virtualized operating systems and/or compute instances in some embodiments, some of which may also use the local FPGA. Multiple remote clients may be permitted to utilize a host's FPGA in at least one embodiment.

Example Virtualization Host Components

Figure 12:
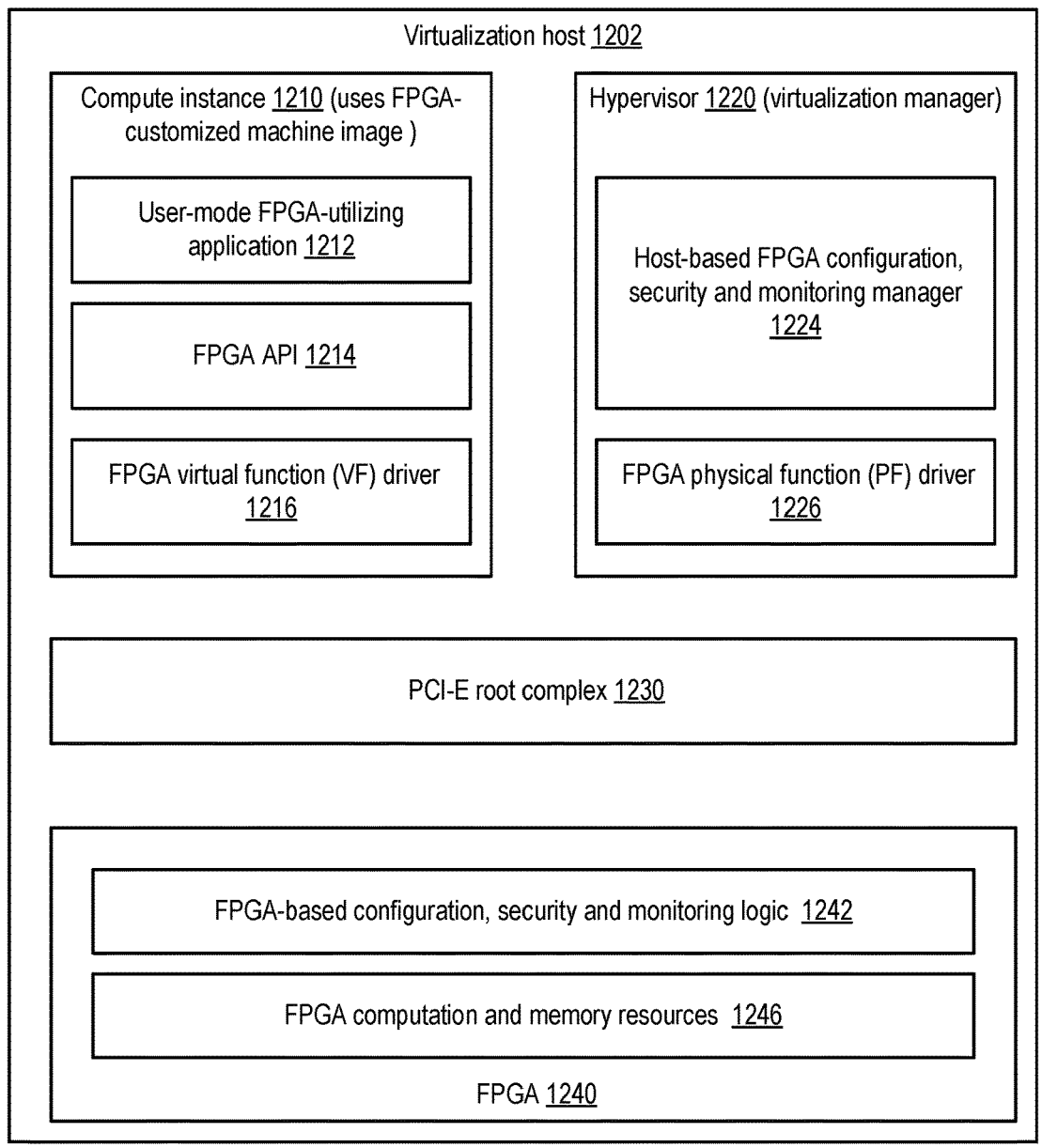
FIG. 12 illustrates example components of a virtualization host comprising an FPGA, according to at least some embodiments.

FIG. 12 illustrates example components of a virtualization host comprising an FPGA, according to at least some embodiments. In the depicted embodiment, FPGA 1240 is attached to a PCI-E expansion bus of the virtualization host 1202. Those skilled in the art will recognize that components analogous to those shown in FIG. 12 may be implemented in embodiments in which other connectivity mechanisms are employed.

Virtualization host 1202 comprises at least a compute instance 1210 instantiated using a virtual machine image customized for FPGA support), a hypervisor 1220, a PCI-E root complex 1230, and an FPGA 1240 in the depicted embodiment. An I/O (input/output) virtualization technology (similar to techniques compliant with the Single Root I/O Virtualization or SR-IOV specification) which involves the use of physical functions and virtual functions is in use at virtualization host 1202. Such an I/O virtualization technology may allow a given PCI-E device such as the FPGA 1240 to be treated as multiple separate PCI-E devices. The compute instance 1210 comprises a guest virtual machine (i.e., a virtual machine that runs in a non-administrative domain) which includes a user-mode FPGA-utilizing application 1212 in addition to an operating system not shown in FIG. 12. User-mode FPGA-utilizing application 1212 may comprise one or more threads or processes which interact with FPGA virtual function driver 1216 via a set of FPGA APIs 1214 in the depicted embodiment. The machine image used to instantiate compute instance 1210 may have been customized, e.g., by adding the FPGA virtual function driver, modules supporting the FPGA APIs and/or the user-mode FPGA-utilizing application 1212 in the depicted embodiment. Creating and/or copying the customized machine image to virtualization host 1202 may represent some of the configuration operations performed or initiated by a VCS resource manager to prepare the virtualization host for a client's FPGA-enabled compute instance 1210 in various embodiments.

Hypervisor 1220 may include, among other subcomponents responsible for various aspects of virtualization management, host-based FPGA configuration, security and monitoring manager 1224, as well as FPGA physical function driver 1226 in the depicted embodiment. In some embodiments, the virtualization host 1202 may comprise a group of virtualization management components including for example an administrative or privileged-domain operating system running in a separate virtual machine from client-owned compute instances in addition to the hypervisor. The virtualization management components (e.g., the hypervisor and/or the privileged-domain operating system instance) may act as intermediaries between the compute instances and various hardware components of the virtualization host 1202 including the FPGA 1240, e.g., by converting API requests directed to the FPGA virtual function driver into corresponding requests directed to the FPGA itself using the FPGA physical function driver 1226, by transmitting responses received from the FPGA into a form which can be processed as an API response by the compute instance 1210. FPGA 1240 may comprise its own configuration, security and monitoring logic 1242, as well as FPGA computation and memory resources 1246 in the depicted embodiment.

The responsibility for implementing the security policies associated with the use of the FPGA 1240 from the compute instance 1210 may be shared among the different high-level entities illustrated in FIG. 12 in the depicted embodiment. For example, the FPGA 1240's logic 1242 may be responsible for enforcing some of the security rules and constraints of the security policies (e.g., for preventing writes to protected regions of FPGA memory and/or other resources, ensuring that operations for which the compute instance and/or the hypervisor have not been granted privileges are rejected, etc.), while the hypervisor 1220's security manager 1224 and/or the compute instance 1210's API layer 1214 may enforce other security rules or constraints. The configuration operations performed by the resource manager to prepare the virtualization host 1202 for the client's FPGA-utilizing application may involve verifying that the appropriate modules or logic for enforcing the security policies are in place (and/or for installing the modules or logic if required) in various embodiments. In some embodiments, for example, the hypervisor and/or the FPGA itself may be programmed to impose limits on the resources that can be accessed from the FPGA and on the FPGA resources which can be accessed from the compute instance.

A number of other approaches with respect to security and monitoring (i.e., different from the approach shown in FIG. 12) may be used in different embodiments. For example, in one embodiment, a client may be provided access to a host with an attached FPGA, and the client may be given full control over security and monitoring with respect to that host. Such a model may be used, for example, if the client requests single-tenant access and/or wishes to run a non-virtualized operating system (e.g., an operating system which interacts directly with hardware, without using virtualization management software such as a hypervisor as an intermediary). In such scenarios, the client may implement any desired security or monitoring policy (e.g., at the operating system and/or at the FPGA), or no security/monitoring policy at all, as desired. In one embodiment, e.g., in response to a client request indicating that the client wishes to obtain access to an FPGA in a maximal-client-control mode, the VCS may indicate that the client is authorized to utilize an FPGA's native programmatic interfaces, e.g., without requiring the use of any intermediaries such as a hypervisor. In such an embodiment, the client may in effect be granted complete or near-complete control of an FPGA located at a provider network, similar to the level of control that the client would have had on an FPGA at the client's own premises. The client may issue any types of commands supported by the FPGA's native interfaces in such scenario, e.g., to program the FPGA as desired, set security/monitoring policies, and so on.

In another embodiment, a client may be provided single-tenant access to a host with an FPGA by the VCS, but the VCS may impose a lightweight layer of security and/or monitoring. Such lightweight security or monitoring may be implemented, for example, at the FPGA or at the FPGA board, and may not require a hypervisor or other virtualization management software. In one embodiment, much or all of the virtualization management functionality typically performed at a hypervisor may be offloaded to a hardware device (e.g., at a peripheral device attached via an I/O bus), and at least some of the FPGA-related security or monitoring operations may also be offloaded to such a device. In one implementation, at least some of the security and/or monitoring operations may be performed at a microcontroller or other similar component attached to the same board as the FPGA. In various embodiments, the operations associated with FPGA security and monitoring may be implemented at any combination of several different component types: the FPGA itself, the board to which the FPGA is attached, virtualization management software stack elements such as hypervisors or administrative-domain operating systems, hardware devices to which the virtualization management functions have been offloaded, non-virtualized operating system instances, FPGA-enabled compute instances, and so on. Furthermore, the decisions determining which specific security and/or monitoring policies are to be enforced, and where those policies are to be enforced, may be made at the VCS alone, by clients alone, or partially at the VCS and partially by clients.

Methods for Supporting FPGA-Enabled Compute Instances

Figure 13:
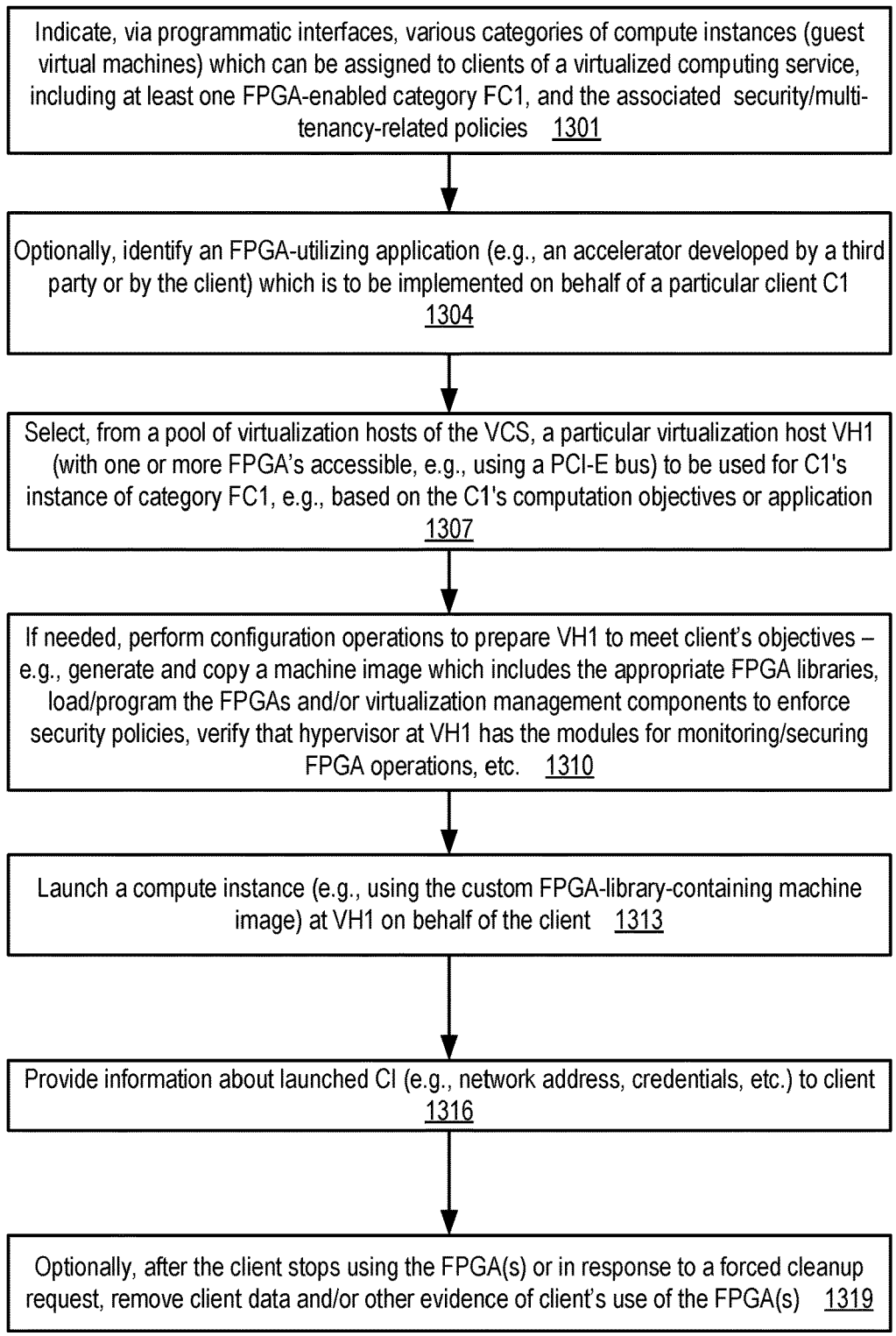
FIG. 13 is a flow diagram illustrating aspects of operations that may be performed to instantiate FPGA-enabled compute instances on behalf of a client of a virtualized computing service, according to at least some embodiments.

FIG. 13 is a flow diagram illustrating aspects of operations that may be performed to instantiate FPGA-enabled compute instances on behalf of a client of a virtualized computing service, according to at least some embodiments. As shown in element 1301, indications of a number of different compute instance categories, including at least one FPGA-enabled compute instance category FC1 may be provided via programmatic interfaces to clients of a virtual computing service (VCS), e.g., by a resource manager implemented at one or more control plane computing devices of the virtual computing service. Information about the security policies, multi-tenancy versus single-tenancy and/or FPGA-sharing options associated with one or more of the compute instance categories may also be provided via the programmatic interfaces to the clients.

The resource manager may optionally identify a particular FPGA-utilizing application (or a group of FPGA-utilizing applications) which is to be executed at a compute instance to be established on behalf of a particular client C1 of the VCS (element 1304) in some embodiments. In other embodiments, a more general indication of the client C1's computation requirements or objectives may be obtained, instead of or in addition to an identification of a particular application or application category. A particular virtualization host VH1 of the VCS may be selected as the site for a compute instance of category FC1 to be set up on the client's behalf (element 1307). The virtualization host VH1 may be selected from a pool of VCS hosts based at least partly on the client's application requirements and/or computational objectives, and may have access to one or more FPGAs (e.g., attached via an expansion bus such as a PCI-E-compliant bus, or via a different interconnect).

As shown in element 1310, one or more configuration operations may be performed to prepare the virtualization host VH1 for the client's application, such as for example preparing and/or copying a virtual machine image which includes the required FPGA-related library modules that can be used for a compute instance of category FC1 on behalf of the client, loading/programming the FPGA, verifying that the virtualization management components including the hypervisor are configured to implement appropriate security or monitoring-related policies for FC1 compute instances, and so on. After the preparatory configuration operations have been performed, a compute instance of category FC1 may be launched at VH1 (element 1313), and the client may be provided with information enabling access to the newly launched compute instance (element 1316), including the network address, login credentials, etc. As discussed earlier, in some embodiments, the virtualization host VH1 may already have a fully pre-configured or partially pre-configured compute instance which can meet the client's computational objectives set up, and such a compute instance may be allocated to the client instead of starting a new compute instance.

In the embodiment depicted in FIG. 13, after the client's FPGA-utilizing application(s) have completed execution or in response to a forced cleanup request from the client, evidence of the client's use of the FPGA may optionally be deleted or removed (element 1319). In some implementations, any programming of the FPGA performed specifically by or on behalf of the client may be undone, e.g., the FPGA may be reverted to the state it was in prior to the allocation of the compute instance on behalf of the client. Other components of the computing environment, such as the virtualization host's memory and/or the virtualization management components (if any are being used) may also be cleaned up to remove traces of the use of the FPGA by the client in some embodiments.

In at least one embodiment, a client may not be restricted to using only one application during the lifetime of a given compute instance. For example, a client may wish to run a first FPGA-utilizing application App11 for some time period on a compute instance CI1, and then switch to running a different FPGA-utilizing application App12 at the same compute instance CI1. In some such embodiments, VCS programmatic interfaces such as APIs and/or web-based consoles may be used by the client to indicate such application changes. If any re-programming or re-configuration of the FPGA being used is required, components of the VCS infrastructure (e.g., at the virtualization management components and/or VCS control plane components outside the virtualization host) may initiate or perform the necessary re-programming or re-configuration in some embodiments. In one embodiment the client may initiate or perform the re-programming or re-configuration.

It is noted that in various embodiments, some of the operations shown in the flow diagram of FIG. 13 may be implemented in a different order than that shown in the figure, or may be performed in parallel rather than sequentially. Additionally, some of the operations shown in the flow diagram may not be required in one or more implementations.

Use Cases

The techniques described above, of establishing a fleet of virtualization hosts with access to one or more FPGAs each, and supporting the assignment and allocation of FPGA-enabled compute instances at which clients may run various types of FPGA-accelerated applications may be useful in a variety of scenarios. FPGAs have become an increasingly popular technology for implementing many compute-intensive application domains, including for example applications associated with communications, defense, medicine, machine learning, audio, vision, chip development, network routing, and the like. Virtual computing services that allow clients to program (within security and other constraints) FPGAs without requiring the clients to perform low-level configuration operations may attract many new customers to provider network-based virtual computing, which may have previously been limited largely to using private data centers. Network-accessible marketplaces for FPGA-dependent or FPGA-utilizing applications, as well as development and testing support (e.g., in the form of SDKs and designated FPGA-equipped execution platforms comprising virtual computing service resources) may also help grow the revenues associated with FPGA-enabled compute instance categories.

Illustrative Computer System

Figure 14:
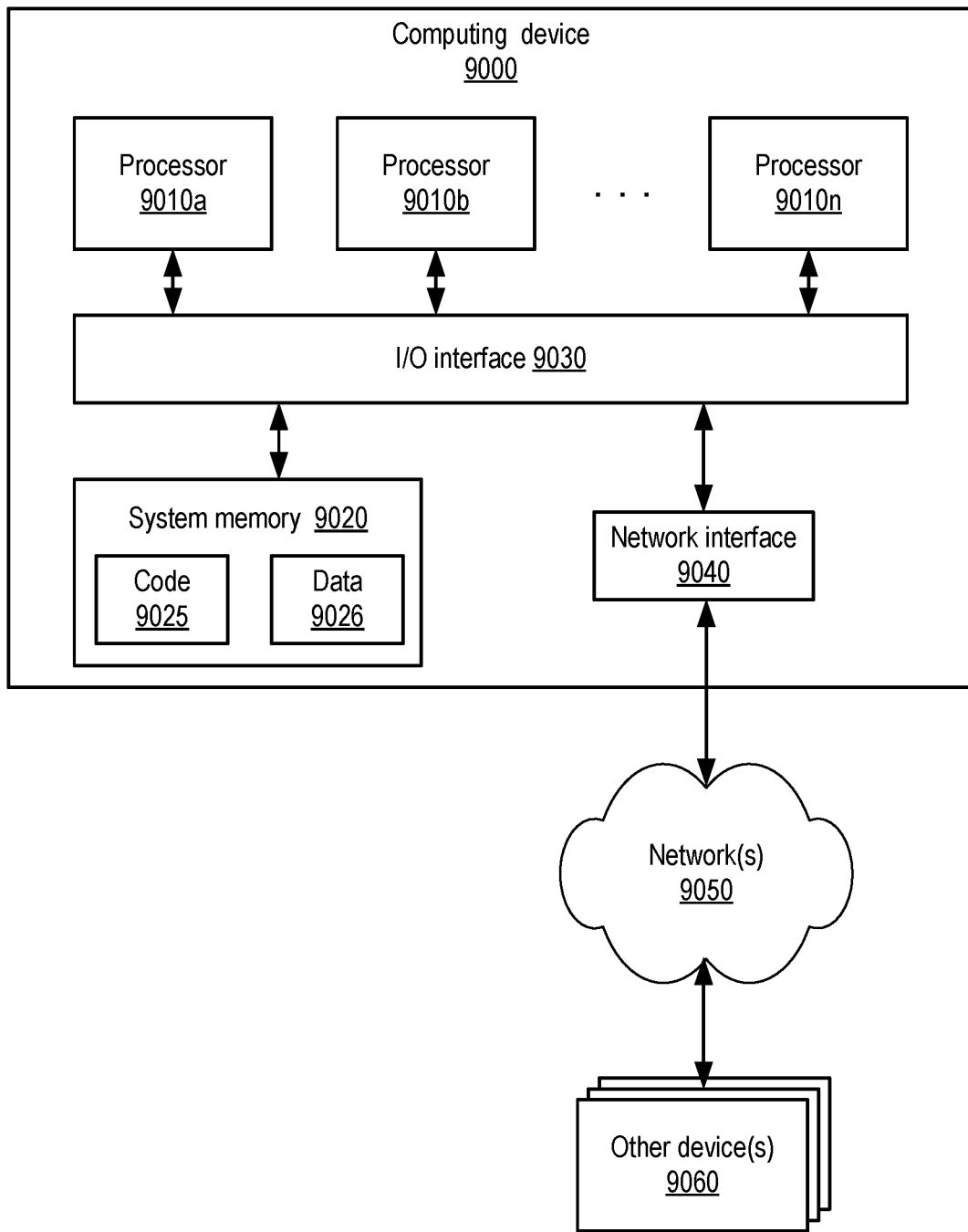
FIG. 14 is a block diagram illustrating an example computing device that may be used in at least some embodiments.

In at least some embodiments, a server that implements one or more of the techniques described above for supporting FPGA-enabled compute instances (including resource managers and other control plane and data plane components of provider networks) may include a general-purpose computer system that includes or is configured to access one or more computer-accessible media. FIG. 14 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard, the PCI-Express or the Universal Serial Bus (USB) standard, for example. FPGAs of various types may be attached via such buses in at least some embodiments. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 13, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 13 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals.

What is claimed is:

1. A computer-implemented method, comprising:
    obtaining, via a programmatic interface, a request to execute a communication application that includes a machine learning workload to process communication data of the communication application;
    configuring, in response to the request, a server equipped with a field programmable gate array (FPGA)-based accelerator to execute the communication application, wherein the FPGA-based accelerator implements a network interface, wherein said configuring comprises configuring the FPGA-based accelerator to accelerate execution of the machine learning workload to process communication data received via the network interface implemented by the FPGA-based accelerator;
    causing execution of at least a portion of the communication application, including the machine learning workload, to be accelerated via processing of the communication data by the FPGA-based accelerator at the server; and
    managing, by a control plane, health and availability of a fleet of servers equipped with FPGA-based accelerators, including the server.

2. The computer-implemented method as recited in claim 1, wherein configuring the server comprises launching a virtual machine at the server.

3. The computer-implemented method as recited in claim 1, further comprising:
    prior to obtaining the request for the accelerator,
        analyzing at least a portion of the communication application; and
        providing, based at least in part on said analyzing, a recommendation to utilize an accelerator for the communication application.

4. The computer-implemented method as recited in claim 1, further comprising:
    selecting, based at least in part on an analysis of requirements of the communication application, the server from a pool of servers equipped with respective accelerators.

5. The computer-implemented method as recited in claim 1, wherein the FPGA-based accelerator comprises an FPGA attached to the server via a peripheral interconnect.

6. The computer-implemented method as recited in claim 5, wherein the network interface is an Ethernet interface and the peripheral interconnect is a Peripheral Connection Interconnect Express (PCI-e) interconnect.

7. The computer-implemented method as recited in claim 1, further comprising:
    providing an indication, by a computing service, of a set of accelerators for respective applications which can be accessed from virtual machines of the computing service, including the FPGA-based accelerator optimized for the communication application.

8. A system, comprising:
    one or more computing devices;
    wherein the one or more computing devices include instructions that upon execution on or across the one or more computing devices:
        obtain via a programmatic interface, a request to execute a communication application that includes a machine learning workload to process communication data of the communication application;
        configure, in response to the request, a server equipped with a field programmable gate array (FPGA)-based accelerator to execute the communication application, wherein the FPGA-based accelerator implements a network interface, wherein said configure comprises configure the FPGA-based accelerator to accelerate execution of the machine learning workload to process communication data received via the network interface implemented by the FPGA-based accelerator;
        cause execution of at least a portion of the communication application, including the machine learning workload, to be accelerated via processing of the communication data by the FPGA-based accelerator at the server; and
        manage, by a control plane, health and availability of a fleet of servers equipped with FPGA-based accelerators, including the server.

9. The system as recited in claim 8, wherein to configure the server, the one or more computing devices include further instructions that upon execution on or across the one or more computing devices:
    copy a virtual machine image comprising an FPGA library to the server.

10. The system as recited in claim 8, wherein the one or more computing devices include further instructions that upon execution on or across the one or more computing devices:
    prior to obtaining the request for the accelerator,
        analyze at least a portion of the communication application; and
        generate, based at least in part on analysis of the portion of the communication application, a recommendation to utilize an accelerator for the communication application.

11. The system as recited in claim 8, wherein the one or more computing devices include further instructions that upon execution on or across the one or more computing devices:

select, based at least in part on an analysis of requirements of the communication application, the server from a plurality of servers equipped with respective accelerators.

12. The system as recited in claim 8, wherein the FPGA-based accelerator comprises an FPGA attached to the server via a peripheral interconnect.

13. The system as recited in claim 8, wherein to configure the server, the one or more computing devices include further instructions that upon execution on or across the one or more computing devices:

verify that a virtualization management component of the server includes logic to implement a security policy associated with an FPGA.

14. The system as recited in claim 8, wherein the one or more computing devices include further instructions that upon execution on or across the one or more computing devices:

providing an indication, by a computing service, of a set of accelerators for respective applications which can be accessed from virtual machines of the computing service, including the FPGA-based accelerator optimized for the communication application.

15. One or more non-transitory computer-accessible storage media storing program instructions that when executed on or across one or more processors:

obtain via a programmatic interface, via a programmatic interface, a request to execute a communication application that includes a machine learning workload to process communication data of the communication application;

configure, in response to the request, a server equipped with a field programmable gate array (FPGA)-based accelerator to execute the communication application, wherein the FPGA-based accelerator implements a network interface, wherein said configure comprises configure the FPGA-based accelerator to accelerate execution of the machine learning workload to process communication data received via the network interface implemented by the FPGA-based accelerometer;

cause execution of at least a portion of the communication application to be accelerated via processing of the communication data by the FPGA-base accelerator at the server; and manage, by a control plane, health and availability of a fleet of servers equipped with FPGA-based accelerators, including the server.

16. The one or more non-transitory computer-accessible storage media as recited in claim 15, wherein to configure the server, the one or more non-transitory computer-accessible storage media store further program instructions that when executed on or across the one or more processors:

generate a virtual machine image comprising an FPGA library.

17. The one or more non-transitory computer-accessible storage media as recited in claim 15, wherein to configure the server, the one or more non-transitory computer-accessible storage media store further program instructions that when executed on or across the one or more processors:

copy a virtual machine image to the server.

18. The one or more non-transitory computer-accessible storage media as recited in claim 15, storing further program instructions that when executed on or across the one or more processors:

prior to obtaining the request for the accelerator,
analyze at least a portion of the communication application; and
generate, based at least in part on analysis of the portion of the communication application, a recommendation to utilize an accelerator for the communication application.

19. The one or more non-transitory computer-accessible storage media as recited in claim 15, storing further program instructions that when executed on or across the one or more processors:

select, based at least in part on an analysis of requirements of the communication application, the server from a plurality of servers equipped with respective accelerators.

20. The one or more non-transitory computer-accessible storage media as recited in claim 15, wherein the FPGA-based accelerator comprises an FPGA attached to the server via a peripheral interconnect.

* * * * *